United States Patent
Na et al.

(10) Patent No.: US 10,601,283 B2
(45) Date of Patent: Mar. 24, 2020

(54) VERTICAL BEARING DEVICE

(71) Applicant: DAIDO METAL COMPANY LTD., Nagoya-shi, Aichi (JP)

(72) Inventors: Kwangik Na, Nagoya (JP); Motohira Yamada, Nagoya (JP); Shigeyoshi Mori, Nagoya (JP)

(73) Assignee: DAIDO METAL COMPANY LTD., Nagoya-Shi, Aichi (JP)

( * ) Notice: Subject to any disclaimer, the term of this patent is extended or adjusted under 35 U.S.C. 154(b) by 73 days.

(21) Appl. No.: 15/901,552

(22) Filed: Feb. 21, 2018

(65) Prior Publication Data
US 2018/0241287 A1   Aug. 23, 2018

(30) Foreign Application Priority Data
Feb. 22, 2017 (JP) ................. 2017-031034

(51) Int. Cl.
*H02K 5/16* (2006.01)
*H02K 5/20* (2006.01)
(Continued)

(52) U.S. Cl.
CPC ........... *H02K 9/19* (2013.01); *F16C 17/02* (2013.01); *F16C 17/04* (2013.01); *F16C 17/243* (2013.01);
(Continued)

(58) Field of Classification Search
CPC .......... H02K 9/19; H02K 5/1675; H02K 5/20; H02K 7/14; H02K 5/163; H02K 9/06;
(Continued)

(56) References Cited

U.S. PATENT DOCUMENTS 1,684,168 A * 9/1928 Bethel .............. H02K 9/06
  310/62
3,078,805 A * 2/1963 Pezzillo .............. F04D 13/064
  417/372
(Continued)

FOREIGN PATENT DOCUMENTS

CN 201016366 Y 2/2008
CN 202579675 U 12/2012
(Continued)

OTHER PUBLICATIONS

Na et al, JP 6050919 B1 EN, English translation from Japanese Patent Office, printed on Jul. 29, 2019 (Year: 2019).*
(Continued)

*Primary Examiner* — John K Kim
(74) *Attorney, Agent, or Firm* — Karceski IP Law, PLLC

(57) ABSTRACT

A cooling portion has an air inlet into which cooling air flows and is positioned in a preset range. When a distance from the upper to lower ends of an oil chamber in the axial direction of a rotating shaft member is h, and the shortest distance between an outer peripheral face of a casing and an inner peripheral face of a cover is a, the preset range is set in the following manner. Specifically, the preset range is set between ¼h upward and ⁵⁄₄h downward relative to the upper end of the oil chamber as a reference point, in the axial direction of the rotating shaft member. Additionally, the preset range is set between the outer peripheral face of the casing and relative to the outer peripheral face of the casing as a reference point, in the radial direction of the rotating shaft member.

6 Claims, 25 Drawing Sheets

(51) Int. Cl.
  *H02K 7/14* (2006.01)
  *H02K 9/06* (2006.01)
  *H02K 9/19* (2006.01)
  *H02K 5/167* (2006.01)
  *F16C 17/04* (2006.01)
  *F16C 17/02* (2006.01)
  *F16C 33/10* (2006.01)
  *F16C 17/24* (2006.01)
  *F16C 17/26* (2006.01)
  *F16C 37/00* (2006.01)

(52) U.S. Cl.
  CPC ............ *F16C 17/26* (2013.01); *F16C 33/105* (2013.01); *F16C 37/00* (2013.01); *H02K 5/163* (2013.01); *H02K 5/1675* (2013.01); *H02K 5/20* (2013.01); *H02K 7/14* (2013.01); *H02K 9/06* (2013.01); *F16C 2380/26* (2013.01); *H02K 2205/03* (2013.01)

(58) Field of Classification Search
  CPC ... H02K 2205/03; F16C 33/105; F16C 17/04; F16C 17/02; F16C 17/26; F16C 37/00; F16C 17/243; F16C 2380/26
  USPC ...................................... 310/54, 62
  See application file for complete search history.

(56) References Cited

U.S. PATENT DOCUMENTS

| | | | | |
|---|---|---|---|---|
| 8,198,770 | B2* | 6/2012 | Hassett | F28D 15/0275 310/58 |
| 10,323,690 | B2* | 6/2019 | Na | F16N 7/366 |
| 2010/0019590 | A1* | 1/2010 | Guedes-Pinto | H02K 1/02 310/53 |
| 2018/0238389 | A1* | 8/2018 | Na | F04D 29/582 |
| 2018/0241287 | A1* | 8/2018 | Na | F16C 17/02 |
| 2018/0245636 | A1* | 8/2018 | Na | F16C 17/10 |

FOREIGN PATENT DOCUMENTS

| | | | | |
|---|---|---|---|---|
| CN | 203546038 | U | 4/2014 | |
| CN | 104823363 | A | 8/2015 | |
| DE | 112016003731 | T5 | 5/2018 | |
| GB | 2556299 | A | 5/2018 | |
| JP | S498638 | A | 1/1974 | |
| JP | H05106636 | A | 4/1993 | |
| JP | H0874852 | A | 3/1996 | |
| JP | 2003293977 | A | 10/2003 | |
| JP | 2012057768 | A | 3/2012 | |
| JP | 6050919 | B1* | 12/2016 | ........... F04D 29/582 |
| JP | 6050919 | B1 | 12/2016 | |
| WO | 2017029852 | A1 | 2/2017 | |

OTHER PUBLICATIONS

British Office Action dated Aug. 3, 2018, for British Patent Application No. GB1802687.2.
Korean Office Action dated Mar. 4, 2019, for Korean Patent Application No. 10-2018-0021075.
Chinese Office Action dated Mar. 25, 2019, for Chinese Patent Application No. 201810150406.6.
Japanese Office Action dated Dec. 4, 2018, for Japanese Patent Application No. 2017-030134.
Korean Office Action dated Jul. 2, 2019, for Korean Patent Application No. 20-2019-0002605.
Japanese Office Action dated May 14, 2019, for Japanese Patent Application No. 2017-031034.
Korean Office Action dated May 21, 2019, for Korean Patent Application No. 10-2018-0021075.
British Office Action dated Jul. 11, 2019, for British Patent Application No. GB 1802687.2.
German Office Action dated Sep. 9, 2019, for German Patent Application No. 102018103964.6.
Chinese Office Action dated Nov. 29, 2019, for Chinese Patent Application No. 2018101504066.

* cited by examiner

VERTICAL BEARING DEVICE

CROSS-REFERENCE TO RELATED APPLICATIONS

This application is based on and claims priority to Japanese Patent Application No. 2017-031034, filed on Feb. 22, 2017, the entire content of which is incorporated herein by reference.

FIELD OF THE INVENTION

The present invention relates to a vertical bearing device.

BACKGROUND OF THE INVENTION

A vertical bearing device that supports a rotating shaft member of a rotary machine such as a large generator and electric motor is publicly known. The vertical bearing device supports both of thrust load in the axial direction and radial load in the radial direction, of the rotating shaft member that extends vertically in the direction of gravitational force. Bearing parts corresponding to axial and radial load of the vertical bearing device become heated by rotation of the rotating shaft member, and therefore need to be appropriately cooled. Conventionally, a vertical bearing device has been adopting an air cooler that cools the whole device mainly by air-blowing, or an oil cooler that cools lubricating oil on the outside. When an air cooler is used, a fan that rotates with the rotating shaft member is used to cool the bearing device by an air flow generated by the fan (Japanese Patent Laid-Open No. 2003-293977). Instead, when an oil cooler is used, a pump device or the like for circulating lubricating oil is used to discharge lubricating oil that lubricates the bearing part to the outside, for example, and the lubricating oil is circulated between the bearing device and the cooler to thereby cool the bearing device (Japanese Patent Laid-Open No. 5-106636).

However, since rotary machines to which the vertical bearing device is applied are becoming larger and high-speed, the heat generated at the bearing parts also tends to increase. For this reason, the vertical bearing device is required to have higher cooling capacity. However, when an air cooler such as that described in Japanese Patent Laid-Open No. 2003-293977 is used, cooling capacity depends on air flow and the contact area between the air flow and radiator fins that come into contact therewith. In other words, to enhance cooling capacity, it is essential to enlarge the surface area of the radiator fins. Accordingly, improvement in cooling capacity causes a problem of enlargement of radiator fins, and therefore enlargement of the vertical bearing device itself.

When an oil cooler is used, enlargement of the vertical bearing device itself can be avoided, but piping from the vertical bearing device to the external oil cooler is required. This complicates structure and maintenance. Moreover, if a failure occurs in the function of the oil cooler or the piping, it becomes difficult to cool the vertical bearing device itself.

Hence, an objective of the present invention is to provide a vertical bearing device that has high cooling capacity, while preventing enlargement and complication of structure and maintenance.

SUMMARY OF THE INVENTION

In a vertical bearing device, in a cooling part having an air inlet and an air outlet that allow passage of cooling air, the air inlet is positioned in a preset range. The preset range is set on the basis of distances among an oil chamber, a casing, and a cover. Specifically, when a distance from the upper to lower ends of the oil chamber in the axial direction of the rotating shaft member is h, and the shortest distance between an outer peripheral face of the casing and an inner peripheral face of the cover is a, the preset range is set in the following manner. The preset range in the axial direction of the rotating shaft member is set between $1/4h$ upward and $5/4h$ downward relative to the upper end of the oil chamber as a reference point. Also, the preset range in the radial direction of the rotating shaft member is set between the outer peripheral face of the casing and $2a$ relative to the outer peripheral face of the casing as a reference point. The lubricating oil is cooled by passing through the cooling part. Accordingly, the lubricating oil is efficiently cooled by appropriately guiding an air flow to the cooling part. Meanwhile, when the cooling part is provided in consideration of only the air flow, the distance between the casing and the cooling part increases, and may enlarge the device. Hence, in the vertical bearing device, the position of the air inlet of the cooling part is specified to a preset range. Thus, a stable air flow can be formed without ensuring a needless amount of distance from the casing to the cooling part. In this way, cooling capacity can be improved while preventing enlargement and complication of structure and maintenance.

DETAILED DESCRIPTION OF THE PREFERRED EMBODIMENTS

Figure 1:
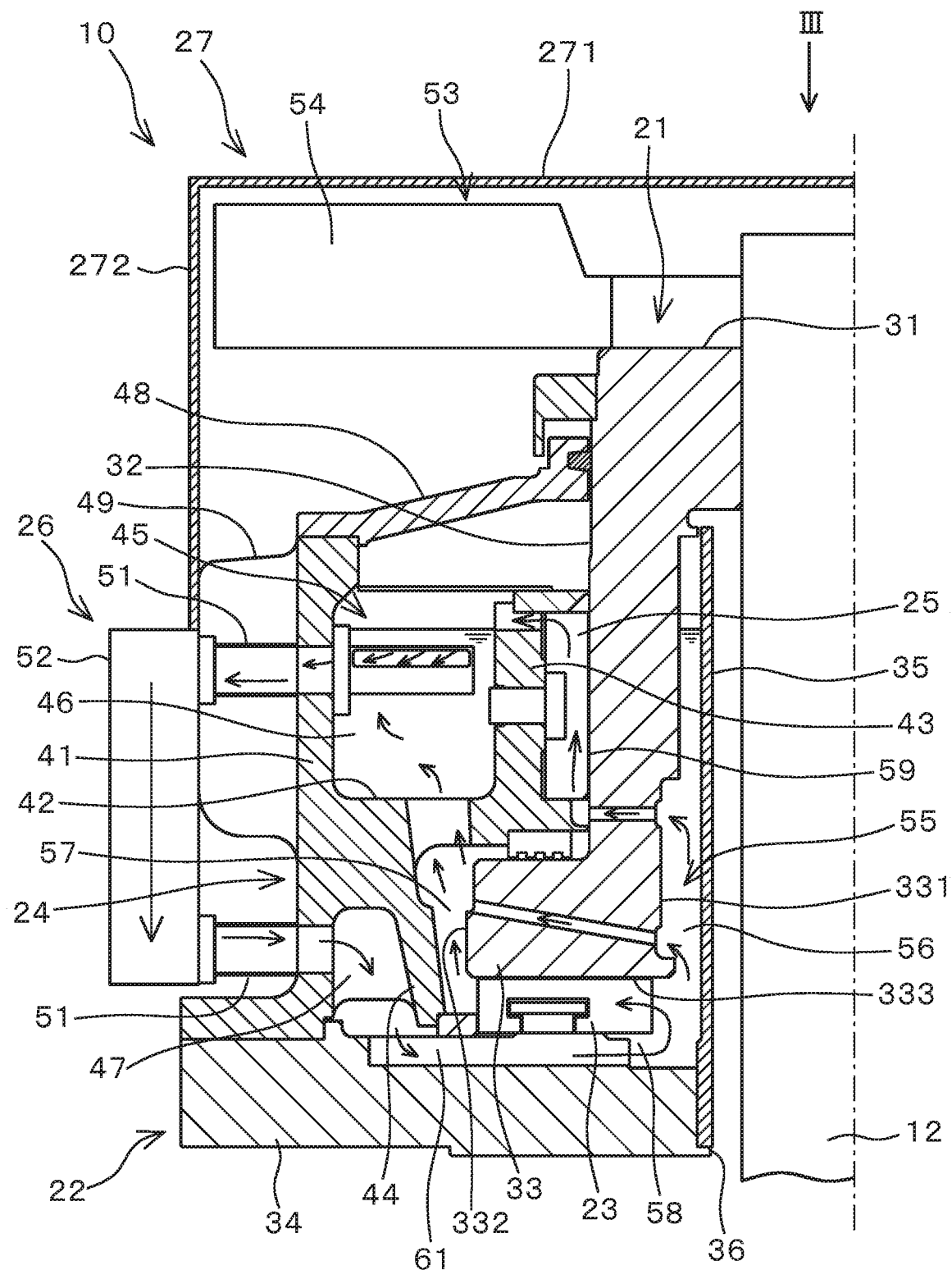
FIG. 1 is a schematic diagram of a section of a vertical bearing device of a first embodiment.

Hereinafter, vertical bearing devices of multiple embodiments will be described on the basis of the drawings. Note that in the multiple embodiments, substantially common parts are assigned the same reference numerals, and descriptions thereof will be omitted.

First Embodiment

Figure 2:
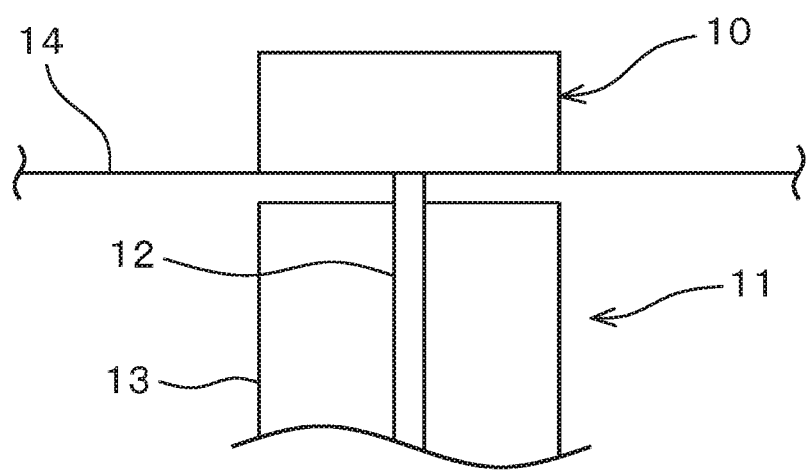
FIG. 2 is a diagram of a rotary machine to which the vertical bearing device of the first embodiment is applied.
Figure 3:
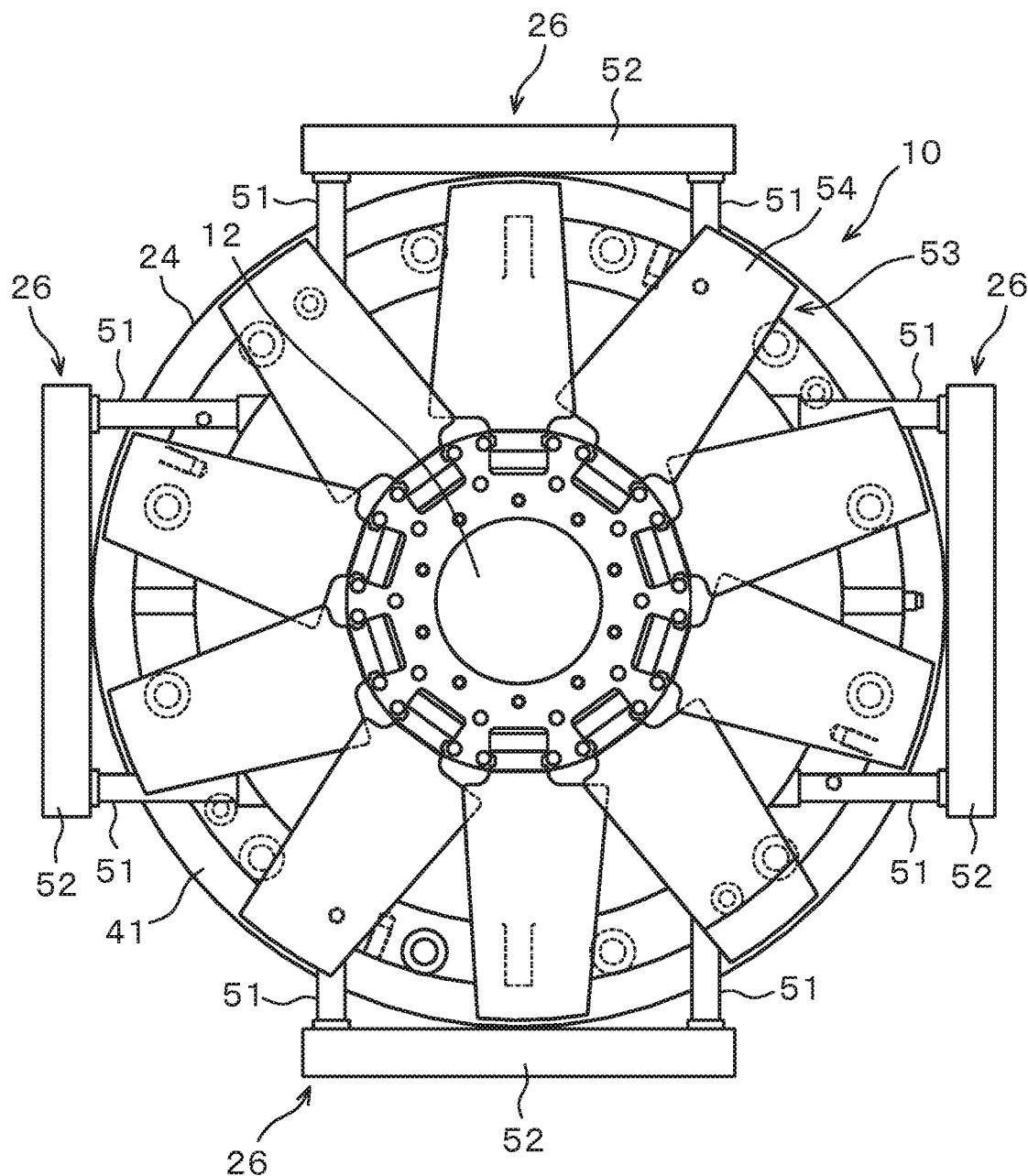
FIG. 3 is an arrow view as seen from an arrow III direction of FIG. 1.

A vertical bearing device 10 illustrated in FIGS. 1, 2, and 3 is used as a bearing of a rotary machine 11 illustrated in FIG. 2. The rotary machine 11 includes a rotor 13 that rotates around a rotating shaft member 12, such as a generator, pump, motor, and a turbine. The rotary machine 11 is not limited to these examples, and may be applied to any device that rotates around a rotating shaft member 12. The rotary machine 11 includes the rotating shaft member 12 at the center of rotation. The rotating shaft member 12 extends vertically in the direction of gravitational force. The vertical bearing device 10 supports the rotating shaft member 12 of the rotary machine 11 at the upper end of the rotary machine 11, that is, on the upper side in the direction of gravitational force. The vertical bearing device 10 is fixed on a floor 14 of a facility, and suspends and supports the rotary machine 11. Note that the rotating shaft member 12 may penetrate the vertical bearing device 10 in the upper direction, and a drive source that drives the rotating shaft member 12 may be provided above the vertical bearing device 10.

As illustrated in FIG. 1, the vertical bearing device 10 includes a thrust collar 21, a base plate 22, a thrust bearing portion 23, a casing 24, a journal bearing portion 25, a cooling portion 26, and a cover 27. The thrust collar 21 is formed into a cylinder, and is provided integrally with the rotating shaft member 12. Accordingly, the thrust collar 21 rotates integrally with the rotating shaft member 12. The thrust collar 21 has an upper face portion 31, a cylinder portion 32, and an annular portion 33. The upper face portion 31, cylinder portion 32, and annular portion 33 are formed as one body. The upper face portion 31 is positioned at the upper end of the thrust collar 21, and the rotating shaft member 12 penetrates the center of the upper face portion 31. The cylinder portion 32 extends downward from the upper face portion 31, and is provided on the axially outer side of the rotating shaft member 12 as a cylinder that is concentric with the rotating shaft member 12. The annular portion 33 is provided at the lower end of the cylinder portion 32, that is, on an end part opposite to the upper face portion 31. The annular portion 33 has a larger outer diameter than the cylinder portion 32, and its end part on the outer peripheral side protrudes farther to the radially outer side than the cylinder portion 32. The annular portion 33 has, in the radial direction of the rotating shaft member 12, an inner peripheral face 331 on the inner peripheral side and an outer peripheral face 332 on the outer peripheral side. The rotating shaft member 12 is assembled integrally with the thrust collar 21 by penetrating the upper face portion 31 of the thrust collar 21. The rotating shaft member 12 is fixed to the thrust collar 21 by press-fitting or welding, for example.

The base plate 22 has a main body 34 and an oil cylinder portion 35. The main body 34 and the oil cylinder portion 35 of the base plate 22 are formed as individual members, or are formed as one body by a single member. In the embodiment, the oil cylinder portion 35 is formed separately from the main body 34, and is attached to the main body 34. The main body 34 is formed into a circular plate having an opening 36 at the center thereof. The rotating shaft member 12 penetrates the center opening 36. The oil cylinder portion 35 is provided as a cylinder formed along the edge of the opening 36 of the main body 34, and extends upward from the main body 34. Hence, the oil cylinder portion 35 cylindrically surrounds the radially outer side of the rotating shaft member 12. The base plate 22 is fixed to the floor 14 of the facility, or is fixed to an unillustrated housing or the like of the rotary machine 11.

The thrust bearing portion 23 is provided in a part where the thrust collar 21 and the base plate 22 face each other. Specifically, the thrust bearing portion 23 is provided in a part where the thrust collar 21 and the base plate 22 face each other in the axial direction of the rotating shaft member 12. In the embodiment, the thrust bearing portion 23 is provided in the main body 34 of the base plate 22, in a position where it faces the annular portion 33 of the thrust collar 21. The thrust bearing portion 23 slides on the annular portion 33 of the thrust collar 21 that rotates together with the rotating shaft member 12. To be specific, the thrust bearing portion 23 slides on a sliding surface 333 on the main body 34 side of the annular portion 33. Thus, the thrust bearing portion 23 axially supports the rotation of the rotating shaft member 12.

The casing 24 surrounds the outer peripheral side of the rotating shaft member 12. The casing 24 has a casing main body 41, a middle wall 42, an inner wall 43, and a lower wall 44. The casing 24 is connected to the base plate 22 on the lower end thereof. The casing 24 forms, together with the base plate 22, a container having an open upper end. The container-like space formed of the casing 24 and the base plate 22 is an oil chamber 45 that stores lubricating oil. In other words, the casing 24 is integrated with the base plate 22 to form a container, and forms the oil chamber 45. The lubricating oil is filled in the oil chamber 45. Specifically, the lower end of the oil chamber 45 coincides with an upper end face of the base plate 22 and a lower end face of the casing 24 in the axial direction of the rotating shaft member 12. Additionally, the upper end of the oil chamber 45 coincides with an upper end face of the casing 24 in the axial direction of the rotating shaft member 12.

The casing main body 41 is formed into an annular shape, and constitutes an outer wall of the casing 24. The lower end of the casing main body 41 is in contact with the base plate 22. The middle wall 42 is provided in the middle of the casing main body 41 in the axial direction, and protrudes radially inward from the casing main body 41. That is, the middle wall 42 protrudes to the rotating shaft member 12 side in an annual shape, from an inner wall of the casing main body 41. The inner wall 43 extends upward from the vicinity of a radially inner end part of the middle wall 42. The inner wall 43 is provided in a cylindrical shape in the vicinity of the radially inner end part of the middle wall 42. The lower wall 44 extends downward from the middle of the middle wall 42 in the radial direction. As in the case of the inner wall 43, the lower wall 44 is provided in a cylindrical shape below the middle wall 42.

Thus, the middle wall 42 of the casing 24 partitions the oil chamber 45 formed with the base plate 22 into an upper oil chamber 46 and a lower oil chamber 47. The upper oil chamber 46 is formed into an annular shape between the casing main body 41 and the inner wall 43, on the upper side of the middle wall 42. Meanwhile, the lower oil chamber 47 is formed into an annular or cylindrical shape between the casing main body 41 and the lower wall 44, on the lower side of the middle wall 42. As described above, the casing 24 uses the middle wall 42 to partition the oil chamber 45 into the upper oil chamber 46 on the upper side and the lower oil chamber 47 on the lower side in the direction of gravitational force. The casing 24 has a top plate 48. The top plate 48 covers the upper end side of the container-shaped oil chamber 45.

The journal bearing portion 25 is provided in a part where the thrust collar 21 and the casing 24 face each other. Specifically, the journal bearing portion 25 is provided in a part where the thrust collar 21 and the casing 24 face each other in the radial direction of the rotating shaft member 12. In the embodiment, the journal bearing portion 25 is provided on the inner wall 43 of the casing 24, in a position where it faces the cylinder portion 32 of the thrust collar 21. The journal bearing portion 25 slides on the cylinder portion 32 of the thrust collar 21 that rotates together with the rotating shaft member 12. To be specific, the journal bearing portion 25 slides on an outer peripheral face of the cylinder portion 32. Thus, the journal bearing portion 25 radially supports the rotation of the rotating shaft member 12.

The cooling portion 26 has a lubricating oil passage portion 51 and a radiating portion 52. The lubricating oil passage portion 51 is configured of a pipe-like member that allows passage of lubricating oil, and has a lubricating oil groove formed therein. The lubricating oil passage portion 51 has one end connected to the upper oil chamber 46, and the other end connected to the lower oil chamber 47. Specifically, the lubricating oil passage portion 51 has an upper end part connected to the upper oil chamber 46, and a lower end part connected to the lower oil chamber 47. The lubricating oil passage portion 51 is directly attached to the casing main body 41. In other words, the lubricating oil passage portion 51 is formed integrally with the casing main body 41. Moreover, the lubricating oil passage portion 51 protrudes radially outward from the casing main body 41. That is, the lubricating oil passage portion 51 is exposed to the outside from the casing main body 41. The radiating portion 52 is provided in the lubricating oil passage portion 51 exposed from the casing main body 41. The radiating portion 52 has unillustrated radiator fins and other parts to ensure surface area for heat exchange. As illustrated in FIG. 3, multiple cooling portions 26 are provided in the circumferential direction of the vertical bearing device 10. In the embodiment, the vertical bearing device 10 includes four cooling portions 26 equally spaced apart in the circumferential direction. The number and arrangement of the cooling portions 26 are not limited to the example illustrated in FIG. 3, and may be set arbitrarily.

Lubricating oil stored in the upper oil chamber 46 illustrated in FIG. 1 flows to the lower oil chamber 47 on the lower side through the lubricating oil passage portion 51, due to gravity and a pumping effect caused by circulation of the lubricating oil. At this time, lubricating oil passes through the lubricating oil passage portion 51 exposed from the casing main body 41. Hence, lubrication oil loses heat in the radiating portion 52 disposed in the way of lubricating oil passage portion 51. That is, lubricating oil loses heat in the radiating portion 52 while flowing from the upper oil chamber 46 to the lower oil chamber 47 through the lubricating oil passage portion 51, and is cooled. As has been described, the cooling portion 26 cools lubricating oil flowing from the upper oil chamber 46 to the lower oil chamber 47.

In addition to the above, the vertical bearing device 10 also includes an air blowing portion 53. The air blowing portion 53 has a fan portion 54 that rotates together with the rotating shaft member 12. Rotation of the fan portion 54 together with the rotating shaft member 12 forms an up-to-down air flow on the outer side of the casing 24. The air flow moves along the top plate 48 and the casing main body 41 of the casing 24, and passes the radiating portion 52 of the cooling portion 26. Thus, the air flow formed by rotation of the fan portion 54 cools the casing 24 and the cooling portion 26. Consequently, heat loss from lubricating oil stored in the oil chamber 45 and lubricating oil passing through the cooling portion 26 is prompted. The casing 24 may have fins 49 in a position where the air flow is formed by rotation of the fan portion 54.

The casing 24 partitions the oil chamber 45 not only into the upper oil chamber 46 and the lower oil chamber 47, but also into a circulation oil chamber 55. The circulation oil chamber 55 is formed in a part of the oil chamber 45 except for the upper oil chamber 46 and the lower oil chamber 47. The circulation oil chamber 55 accommodates a part of the cylinder portion 32 and the annular portion 33 of the thrust collar 21. Additionally, the thrust bearing portion 23 and the journal bearing portion 25 are provided in the circulation oil chamber 55. That is, the thrust bearing portion 23 that slides on the annular portion 33 of the thrust collar 21 is positioned on the lower side of the circulation oil chamber 55. Meanwhile, the journal bearing portion 25 that slides on the cylinder portion 32 of the thrust collar 21 is positioned on the upper side of the circulation oil chamber 55.

The circulation oil chamber 55 includes an inner peripheral passage 56, an outer peripheral passage 57, a thrust chamber 58, and a journal chamber 59. The inner peripheral passage 56 is formed between the inner peripheral face 331 of the annular portion 33 and the oil cylinder portion 35 of the base plate 22. The outer peripheral passage 57 is formed between the outer peripheral face 332 of the annular portion 33 and the middle wall 42 and lower wall 44 of the casing 24. The inner peripheral passage 56 and the outer peripheral passage 57 are formed into an annular shape continuous in the circumferential direction of the rotating shaft member 12. The thrust chamber 58 is formed between the lower end of the annular portion 33 and the base plate 22. The thrust chamber 58 accommodates the thrust bearing portion 23. The journal chamber 59 is formed between the cylinder portion 32 of the thrust collar 21 and the inner wall 43 of the casing 24. The journal chamber 59 accommodates the journal bearing portion 25.

The lubricating oil having moved from the upper oil chamber 46 to the lower oil chamber 47 through the cooling portion 26 flows into the circulation oil chamber 55, through a lower oil groove 61 formed in the base plate 22. The lower oil groove 61 is formed as a radially extending groove or an annular recess on the upper side, that is, on the casing 24 side, of the base plate 22. Lubricating oil in the lower oil chamber 47 passes through the lower oil groove 61 to move to the inner peripheral passage 56 of the circulation oil chamber 55.

The lubricating oil having flowed into the circulation oil chamber 55 is returned to the upper oil chamber 46, by use of rotation of the thrust collar 21 inside the circulation oil chamber 55. Thus, the lubricating oil stored in the upper oil chamber 46 is circulated through the cooling portion 26, lower oil chamber 47, lower oil groove 61, and circulation oil chamber 55. Details of the system for circulating lubricating oil will be described later. Heat generated by sliding of the thrust bearing portion 23 and the journal bearing portion 25 is absorbed by the circulating lubricating oil. Then, the absorbed heat is passed through the cooling portion 26 by circulation of the lubricating oil, and is thereby dissipated in the cooling portion 26. As a result, the lubricating oil is cooled, and cooling of the thrust bearing portion 23 and journal bearing portion 25 where frictional heat is generated is prompted.

As illustrated in FIG. 1, the cover 27 is provided on the outer side of the casing 24. In the embodiment, the cover 27 is formed into a container shape that covers upper and lateral sides of the casing 24, and has a ceiling portion 271 and a side cylinder portion 272. The ceiling portion 271 is positioned above the casing 24 in the axial direction of the rotating shaft member 12. The side cylinder portion 272 is positioned outside the casing 24 in the radial direction of the rotating shaft member 12. Accordingly, the air blowing portion 53 is accommodated between the cover 27 and the casing 24. The ceiling portion 271 and the side cylinder portion 272 have unillustrated openings for introducing outside air thereinto, to form an air flow by the air blowing portion 53.

Next, the system for circulating lubricating oil from the circulation oil chamber 55 to the upper oil chamber 46 will be described in detail.

Figure 4:
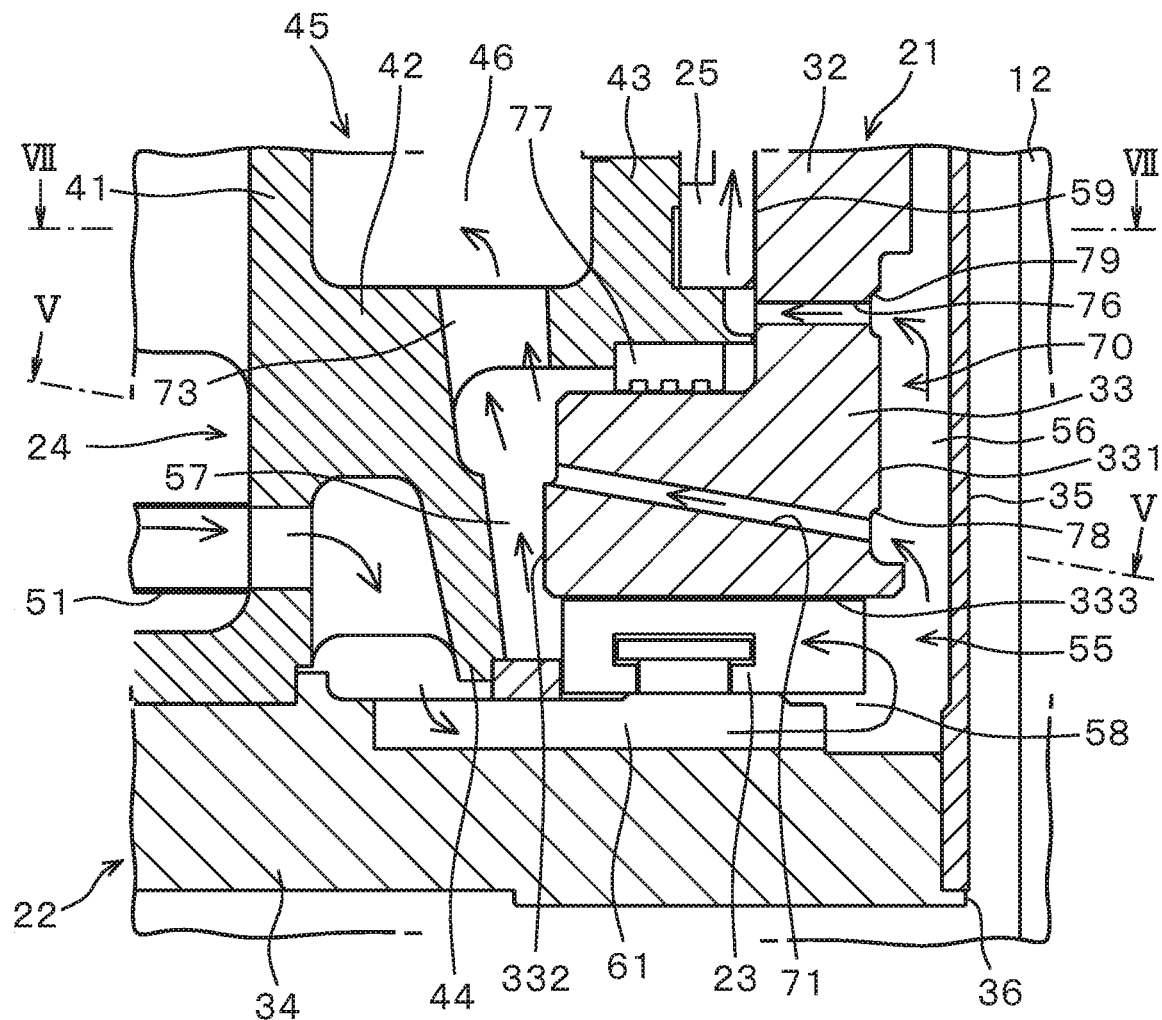
FIG. 4 is an enlarged view enlarging the vicinity of an annular part of the vertical bearing device of FIG. 1.
Figure 5:
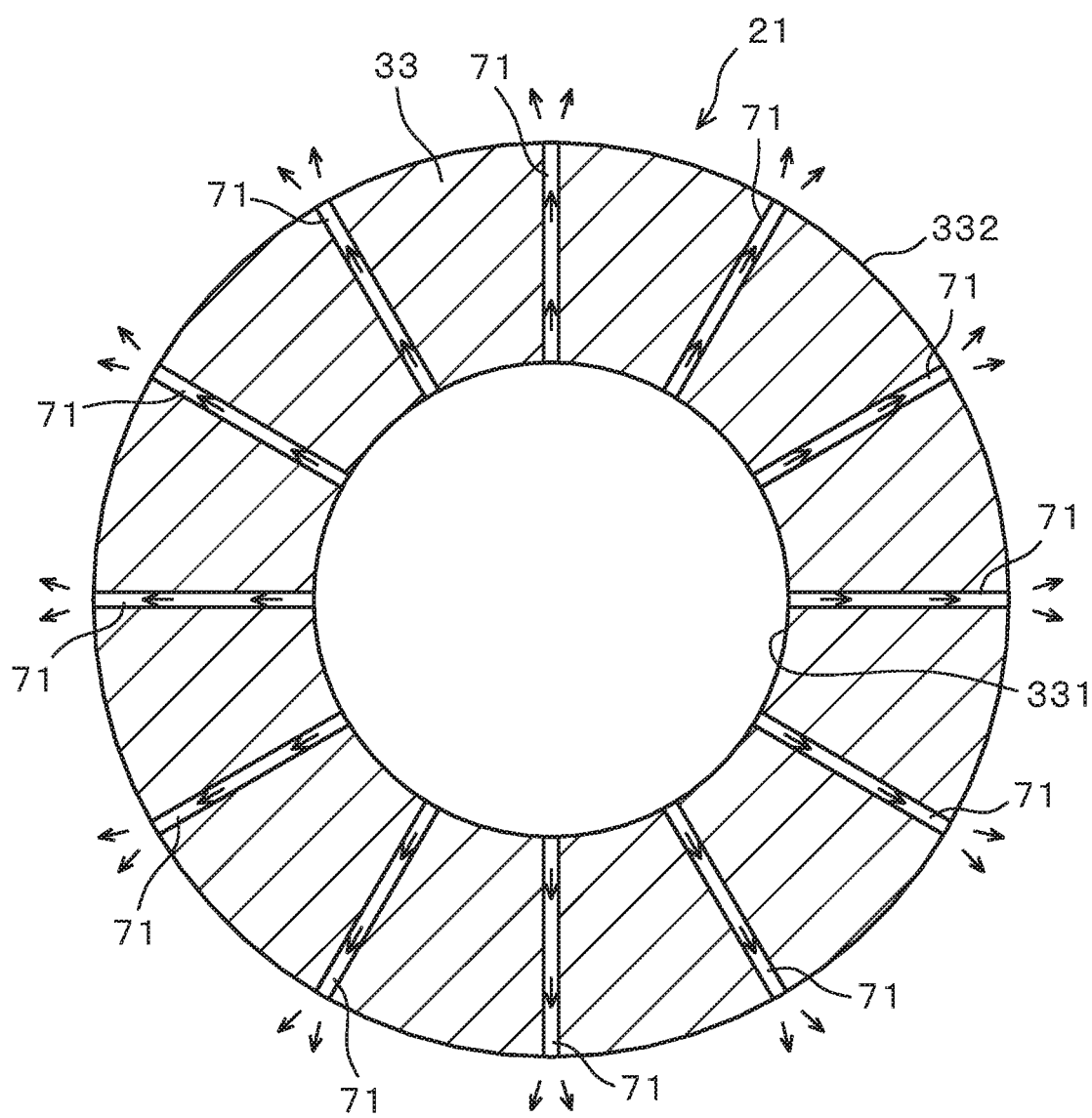
FIG. 5 is a cross-sectional view of the annular part illustrated in FIG. 4, cut along line V-V of FIG. 4.

As illustrated in FIG. 4, the vertical bearing device 10 includes a circulation system part 70. The circulation system part 70 has a circulation hole 71. The circulation hole 71 is provided in the annular portion 33 of the thrust collar 21, and penetrates the annular portion 33 from inner to outer sides in the radial direction. As illustrated in FIG. 5, multiple circulation holes 71 are extend radially in the circumferential direction of the annular portion 33. In the embodiment, the annular portion 33 has 12 circulation holes 71 extending radially in the circumferential direction. One end of the circulation hole 71 opens on the outer peripheral face 332 of the annular portion 33, and the other end opens on the inner peripheral face 331 of the annular portion 33. Additionally, as illustrated in FIG. 4, the circulation hole 71 is tilted upward from the inner peripheral face 331 toward the outer peripheral face 332 in the radial direction of the rotating shaft member 12. In other words, of the circulation hole 71, the end on the outer peripheral face 332 side is positioned higher than the end on the inner peripheral face 331 side in the axial direction of the rotating shaft member 12. Note that the circulation hole 71 may be tilted with respect to the radial direction of the annular portion 33. Each of or each group of the circulation hole 71 may have the same or different widths and/or orientations. Note, however, that in the context of manufacturing, it is preferable that the circulation holes 71 all have the same width and orientation. As described above, the width and orientation of the circulation holes 71 can be set arbitrarily to control movement of lubricating oil, depending on the required performance of the vertical bearing device 10.

Since the circulation holes 71 are provided in the annular portion 33, when the thrust collar 21 rotates together with the rotating shaft member 12, lubricating oil on the inner peripheral side of the annular portion 33 in the circulation oil chamber 55 is guided to the outer peripheral side of the annular portion 33 by the circulation holes 71. That is, since the thrust collar 21 rotates relative to the fixed base plate 22, the lubricating oil on the inner peripheral side of the annular portion 33 flows toward the upper oil chamber 46 through the circulation holes 71. Thus, a flow of lubricating oil from the circulation oil chamber 55 toward the upper oil chamber 46 is formed. At this time, the upward inclination of the circulation holes 71 allows the lubricating oil to be guided more smoothly toward the upper oil chamber 46 on the upper side. Since the lubricating oil in the circulation oil chamber 55 flows into the upper oil chamber 46 through the circulation holes 71, the lubricating oil in the lower oil chamber 47 is supplied to the circulation oil chamber 55 through the lower oil groove 61. The lower oil groove 61 connects the lower oil chamber 47 and the inner peripheral passage 56 of the circulation oil chamber 55. That is, the lubricating oil stored in the lower oil chamber 47 is supplied to the inner peripheral passage 56 from the lower oil chamber 47, through the lower oil groove 61.

Figure 6:
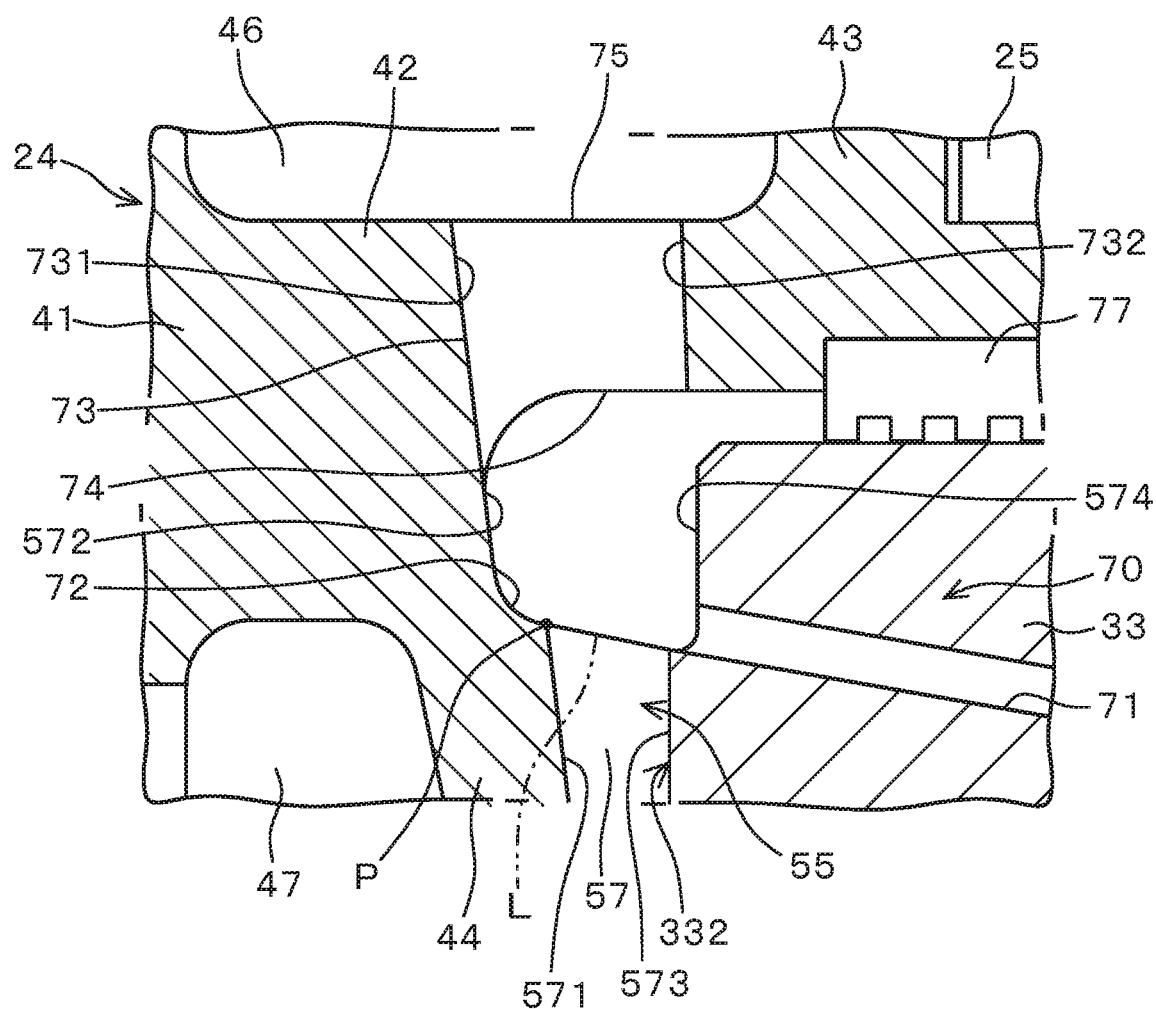
FIG. 6 is an enlarged view enlarging the vicinity of a connection hole of the vertical bearing device illustrated in FIG. 4.

As described above, the outer peripheral passage 57 is formed between the outer peripheral face 332 of the annular portion 33 of the thrust collar 21 and the middle wall 42 and lower wall 44 of the casing 24. The distance between the outer peripheral face 332 and the casing 24 in the outer peripheral passage 57, is preferably set larger on the upper part than in the lower part in the axial direction of the rotating shaft member 12. To give a specific description, the lower end of the circulation hole 71 provided in the annular portion 33 is extended to set a virtual line L. As illustrated in FIG. 6, when the lower end of the circulation hole 71 is extended, the virtual line L intersects with the casing 24. With this, the outer peripheral passage 57 is formed by being surrounded with faces 571 and 572 which are inner walls of the casing 24, and faces 573 and 574 which constitute the outer peripheral face 332 of the annular portion 33. In the outer peripheral passage 57, the distance between the faces 572 and 574 facing each other above the virtual line L is set larger than the distance between the faces 571 and 573 facing each other below the virtual line L. To be more specific, the outer peripheral passage 57 surrounded by the middle wall 42 and lower wall 44 of the casing 24 and the annular portion 33 bulges toward the outer peripheral side, above an intersection point P where the outer peripheral passage 57 intersects with the virtual line L. Thus, in the outer peripheral passage 57, the distance between opposing faces increases above the virtual line L. In addition, the casing 24 may have a curved face portion 72 on a wall face extending upward from the intersection point P. In other words, an end part on the inner peripheral side of the middle wall 42 and lower wall 44 of the casing 24 may have the curved face portion 72 curving upward from the intersection point P. Note that the outer peripheral passage 57 may be formed such that the distance between the casing 24 and the outer peripheral face 332 increases continuously from lower to upper sides, in a section including the center axis of the rotating shaft member 12.

Figure 7:
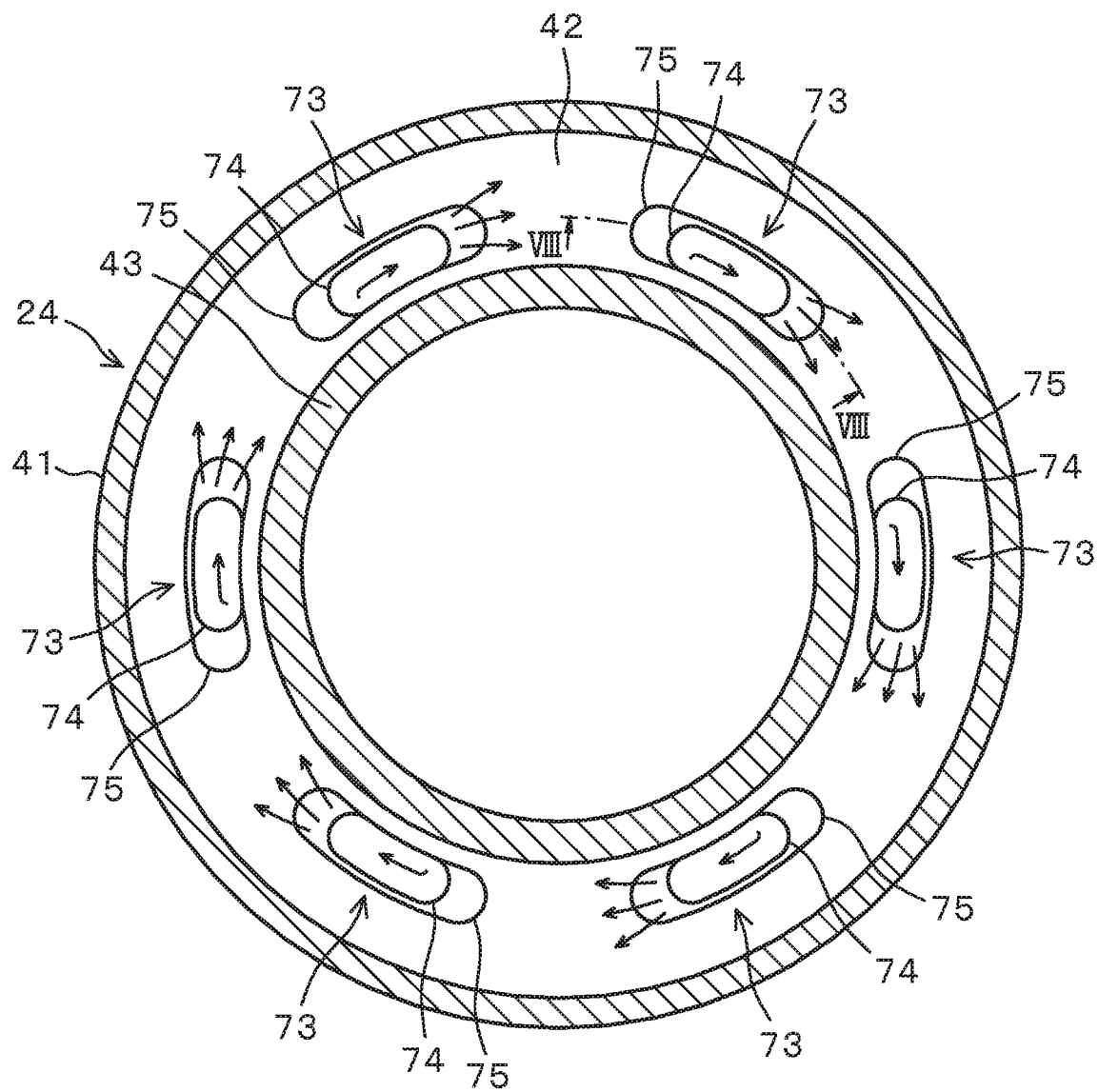
FIG. 7 is a cross-sectional view of a casing of the vertical bearing device of the first embodiment, cut along line VII-VII of FIG. 4.
Figure 8:
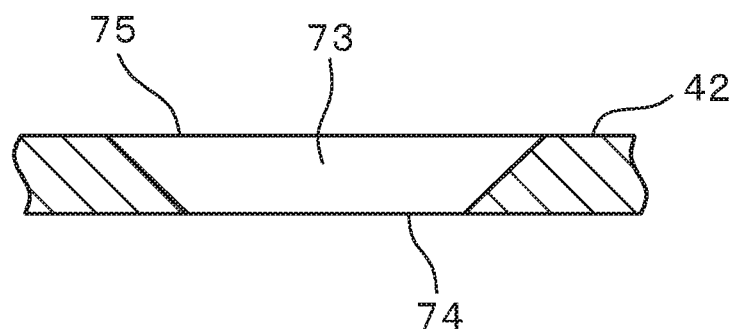
FIG. 8 is a cross-sectional view of the vicinity of the connection hole of FIG. 7, cut along line VIII-VIII of FIG. 7.

The casing 24 has a connection hole 73 in the middle wall 42 that separates the circulation oil chamber 55 and the upper oil chamber 46. In other words, the connection hole 73 connects the circulation oil chamber 55 and the upper oil chamber 46 by penetrating the middle wall 42. The connection hole 73 has a radially outer face 731 and a radially inner face 732. The connection hole 73 has a lower opening 74 and an upper opening 75. The lower opening 74 is a lower end of the connection hole 73, and opens to the outer peripheral passage 57 of the circulation oil chamber 55. The upper opening 75 is an upper end of the connection hole 73, and opens to the upper oil chamber 46. As illustrated in FIGS. 7 and 8, in the connection hole 73, it is preferable that the opening area of the lower opening 74 be smaller than the opening area of the upper opening 75. It is also preferable that the connection hole 73 be formed into a tapered shape where the sectional area increases continuously from the lower opening 74 toward the upper opening 75.

Multiple connection holes 73 are provided in the circumferential direction of the casing 24. In the embodiment, the casing 24 has six connection holes 73 in the circumferential direction. The number of connection holes 73 may be set arbitrarily. As illustrated in FIGS. 6 and 7, for example, in the middle wall 42 in which the connection hole 73 is formed, it is preferable that the face 732 on the inner peripheral side in the radial direction of the rotating shaft member 12 extend parallel to the axis of the rotating shaft member 12. That is, in the embodiment, the connection hole 73 is formed such that the inner peripheral face 732 is parallel to the center axis of the rotating shaft member 12. Meanwhile, in the middle wall 42 in which the connection hole 73 is formed, the outer peripheral face 731 in the radial direction of the rotating shaft member 12 is tilted relative to the center axis of the rotating shaft member 12. That is, in the connection hole 73, the outer peripheral face 731 is tilted in such a manner as to draw away from the rotating shaft member 12 toward the upper side. Hence, the connection hole 73 is formed into a tapered shape where the sectional area increases continuously from the circulation oil chamber 55 side, toward the upper oil chamber 46.

Figure 9:
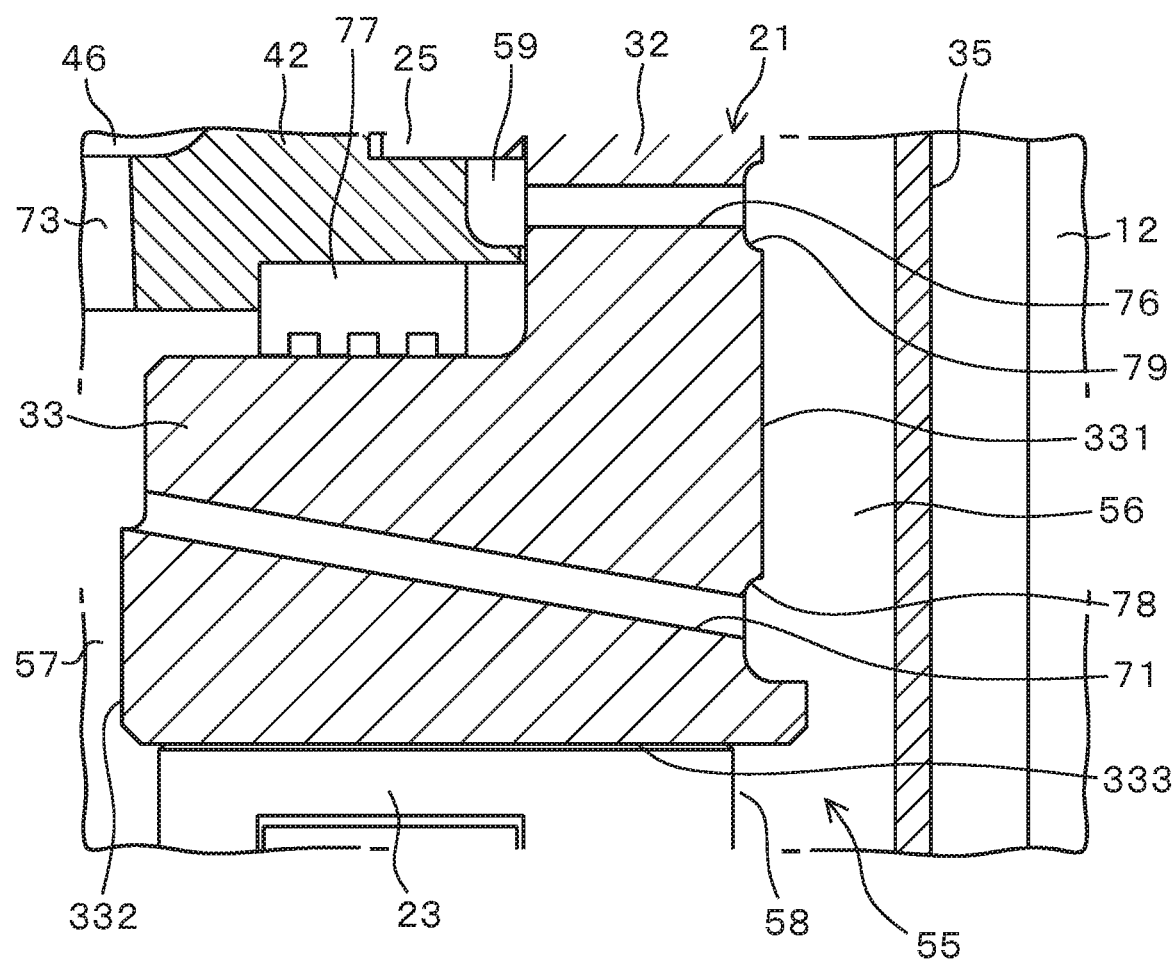
FIG. 9 is an enlarged view further enlarging the vicinity of the annular part of the vertical bearing device illustrated in FIG. 4.

As illustrated in FIGS. 4 and 9, the vertical bearing device 10 includes a journal through hole 76. The journal through hole 76 penetrates the cylinder portion 32 of the thrust collar 21 in the radial direction. The journal through hole 76 connects the inner peripheral passage 56 of the circulation oil chamber 55 and the journal chamber 59, by penetrating the cylinder portion 32. Hence, lubricating oil in the inner peripheral passage 56 of the circulation oil chamber 55 flows into the journal chamber 59 through the journal through hole 76. The lubricating oil having flowed into the journal chamber 59 is circulated into the upper oil chamber 46 from the journal chamber 59, by rotation of the thrust collar 21. At this time, the lubricating oil having flowed into the journal chamber 59 lubricates the journal bearing portion 25, and flows into the upper oil chamber 46. The journal through hole 76 may or may not be tilted from the inner peripheral side to the outer peripheral side, in radial and axial directions of the rotating shaft member 12. Additionally, each of or each group of the journal through hole 76 may have the same or different widths and/or orientations. Note, however, that in the context of manufacturing, it is preferable that the journal through holes 76 all have the same width and orientation. As described above, the width and orientation of the journal through holes 76 can be set arbitrarily to control movement of lubricating oil, depending on the required performance of the vertical bearing device 10.

The vertical bearing device 10 includes a seal member 77. The seal member 77 is provided in a position where the upper end of the annular portion 33 of the thrust collar 21 and the lower end of the middle wall 42 of the casing 24 face each other. As mentioned earlier, the circulation oil chamber 55 includes the thrust chamber 58 that accommodates the thrust bearing portion 23, and the journal chamber 59 that accommodates the journal bearing portion 25. The lubricating oil supplied to the circulation oil chamber 55 from the lower oil chamber 47 through the lower oil groove 61, is circulated to the upper oil chamber 46 through the following three circulation paths in the circulation oil chamber 55.

Path 1: circulation path starting from the inner peripheral passage 56, lubricating the thrust bearing portion 23 of the thrust chamber 58, and flowing toward the upper oil chamber 46 through the outer peripheral passage 57 and the connection hole 73

Path 2: circulation path starting from the inner peripheral passage 56, and flowing toward the upper oil chamber 46 through the circulation hole 71 of the annular portion 33, the outer peripheral passage 57, and the connection hole 73

Path 3: circulation path starting from the inner peripheral passage 56, lubricating the journal bearing portion 25 of the journal chamber 59 after passing through the journal through hole 76, and flowing toward the upper oil chamber 46

As described above, lubricating oil in the circulation oil chamber 55 flows into the upper oil chamber 46 through three paths. At this time, the lubricating oil having flowed into the journal chamber 59 through Path 3 may pass through between the upper end of the annular portion 33 and the lower end of the middle wall 42 and form a flow into the outer peripheral passage 57, instead of lubricating the journal bearing portion 25 accommodated in the journal chamber 59. For this reason, the seal member 77 is provided between the upper end of the annular portion 33 and the lower end of the middle wall 42. Thus, the flow of lubricating oil in Path 3 from the journal through hole 76 directed toward the outer peripheral passage 57 is restricted by the seal member 77. Conversely, the seal member 77 also restricts the lubricating oil flowing through the outer peripheral passage 57 after passing through Path 1 or 2 from flowing into the journal chamber 59. Lubricating oil having passed through Path 1 and cooled the thrust bearing portion 23 of the thrust chamber 58 also flows through the outer peripheral passage 57. The lubricating oil having passed through Path 1 is heated after cooling the thrust bearing portion 23. If the heated lubricating oil flows into the journal chamber 59, it may hinder cooling of the journal bearing portion 25 accommodated in the journal chamber 59 by lubricating oil. Hence, the seal member 77 is provided to restrict the flow of lubricating oil from the outer peripheral passage 57 into the journal chamber 59 as well.

The upper end of the annular portion 33 and the lower end of the middle wall 42 are also parts where the fixed casing 24 and the rotating thrust collar 21 face each other in the axial direction of the rotating shaft member 12. Accordingly, the seal member 77 may be a secondary thrust bearing portion that supports the thrust collar 21 in the axial direction, together with the thrust bearing portion 23. That is, the seal member 77 supports the rotating shaft member 12 in the axial direction, together with the thrust bearing portion 23.

As illustrated in FIGS. 4 and 9, the thrust collar 21 may have introduction portions 78 and 79. The introduction portion 78 is provided in the inner peripheral face 331 of the annular portion 33 of the thrust collar 21. Meanwhile, the introduction portion 79 is provided on an inner peripheral face of the cylinder portion 32 of the thrust collar 21. Ends of the circulation hole 71 and the journal through hole 76 open on the inner peripheral face of the thrust collar 21. The introduction portion 78 is provided at the inner peripheral opening of the circulation hole 71. Similarly, the introduction portion 79 is provided at the inner peripheral opening of the journal through hole 76. The introduction portion 78 is recessed radially outward from the inner peripheral face 331. In addition, the introduction portion 78 is formed such that its inner diameter gradually decreases from the inner peripheral face 331 toward the opening of the circulation hole 71. Similarly, the introduction portion 79 is recessed radially outward from the inner peripheral face of the cylinder portion 32. The introduction portion 79, too, is formed such that its inner diameter gradually decreases from the inner peripheral face of the cylinder portion 32 toward the opening of the journal through hole 76. The introduction portions 78 and 79 are provided in the circulation hole 71 and the journal through hole 76 that open on the inner peripheral face of the thrust collar 21, respectively. Note that the introduction portions 78 and 79 may be formed into a circumferentially continuous groove on the inner peripheral face of the thrust collar 21. In this case, each of the introduction portions 78 and 79 is formed such that its inner diameter in the axial direction of the rotating shaft member 12 gradually decreases toward the opening of the circulation hole 71 or the journal through hole 76. The groove-like part as the introduction portions 78 and 79 may be formed into an annular shape continuous in the circumferential direction of the thrust collar 21, or may be discontinuous in the circumferential direction. Moreover, the circumferential depth and axial width of the groove-like parts serving as the introduction portions 78 and 79 may be changed arbitrarily in different positions. The introduction portion 78 guides lubricating oil in the inner peripheral passage 56 into the circulation hole 71. Similarly, the introduction portion 79 guides lubricating oil in the inner peripheral passage 56 into the journal through hole 76. This prompts the lubricating oil in the inner peripheral passage 56 to flow into the circulation hole 71 and the journal through hole 76. Note that the embodiment illustrates an example in which both of the introduction portions 78 and 79 are formed. However, the configuration may include one or both of the introduction portions 78 and 79.

A description will be given of circulation of lubricating oil and cooling of the thrust bearing portion 23 and the journal bearing portion 25 by lubricating oil, according to the vertical bearing device 10 configured in the above manner.

The thrust collar 21 rotates together with the rotating shaft member 12. Accordingly, the thrust collar 21 rotates inside the fixed base plate 22 and casing 24. Lubricating oil stored in the circulation oil chamber 55 forms a flow directed from inner to outer sides of the rotating shaft member 12, that is, from the inner peripheral passage 56 to the outer peripheral passage 57, due to centrifugal force and shear force caused by rotation of the thrust collar 21, or differential pressure caused by difference in flow rate, for example. This flow causes the lubricating oil in the inner peripheral passage 56 to circulate to the upper oil chamber 46 through the thrust chamber 58 as in the aforementioned Path 1, through the circulation hole 71 as in the aforementioned Path 2, and through the journal chamber 59 as in the aforementioned Path 3.

The circulation hole 71 constituting Path 2 penetrates the annular portion 33 of the thrust collar 21, and therefore lubricating oil receives relatively low resistance through the path. Meanwhile, the thrust chamber 58 constituting Path 1 accommodates the thrust bearing portion 23. Hence, the flow rate of lubricating oil passing through the circulation hole 71 becomes higher than the flow rate of lubricating oil passing through the thrust chamber 58. The lubricating oil having passed the circulation hole 71 and having a high flow rate flows out to the outer peripheral passage 57, and its flow direction is smoothly directed upward along the curved face portion 72 formed in the casing 24. Thus, lubricating oil having flowed into the outer peripheral passage 57 from the circulation hole 71 changes its flow direction upward along the curved face portion 72, and flows into the connection hole 73. At this time, the flow rate of lubricating oil from the circulation hole 71 toward the connection hole 73 is higher than the flow rate of lubricating oil from the thrust chamber 58 to the outer peripheral passage 57. The difference in flow rate between lubricating oil flowing through different paths causes the lubricating oil flowing from the thrust chamber 58 to the outer peripheral passage 57 to be absorbed into lubricating oil directed from the circulation hole 71 toward the connection hole 73. As a result, the lubricating oil passing through the thrust chamber 58 of Path 1 having a high resistance is drawn up into the upper oil chamber 46 through the connection hole 73, by the flow of lubricating oil passing through the circulation hole 71 of Path 2. Hence, the lubricating oil having cooled the thrust bearing portion 23 in the thrust chamber 58 does not accumulate in the thrust chamber 58 and the outer peripheral passage 57, but is circulated to the upper oil chamber 46.

Additionally, rotation of the thrust collar 21 circulates a part of lubricating oil in the inner peripheral passage 56 to the upper oil chamber 46, through the journal through hole 76 and the journal chamber 59 constituting Path 3. In this case, too, the lubricating oil in the inner peripheral passage 56 flows into the journal chamber 59 through the journal through hole 76, due to centrifugal force and shear force caused by rotation of the thrust collar 21, or differential pressure caused by difference in flow rate, for example. The lubricating oil having flowed into the journal chamber 59 is caused to flow into the upper oil chamber 46 from the journal chamber 59, after lubricating oil is continuously supplied to the journal chamber 59 by rotation of the thrust collar 21. Hence, the lubricating oil having cooled the journal bearing portion 25 in the journal chamber 59 does not accumulate in the journal chamber 59, but is circulated to the upper oil chamber 46.

The lubricating oil having returned to the upper oil chamber 46 by circulation flows down to the lower oil chamber 47, due to gravity and a pumping effect caused by circulation of the lubricating oil. At this time, since the upper oil chamber 46 is connected to the cooling portion 26, lubricating oil in the upper oil chamber 46 flows into the lower oil chamber 47 through the cooling portion 26. Although the upper oil chamber 46 is connected to the outer peripheral passage 57 of the circulation oil chamber 55 through the connection hole 73, lubricating oil passing through Paths 1 and 2 flow into the upper oil chamber 46 through the connection hole 73, as described earlier. Hence, it is assumed that no flow of lubricating oil from the upper oil chamber 46 toward the circulation oil chamber 55 through the connection hole 73 will occur.

The lubricating oil having flowed into the cooling portion 26 loses heat by passing through the radiating portion 52. Specifically, the lubricating oil having absorbed the heat generated from sliding of the thrust bearing portion 23 and the journal bearing portion 25 loses heat by passing through the cooling portion 26. The cooled lubricating oil flows into the lower oil chamber 47. When the thrust collar 21 rotates, lubricating oil in the circulation oil chamber 55 flows out toward the upper oil chamber 46, as mentioned earlier. Hence, when the lubricating oil in the circulation oil chamber 55 decreases, the lubricating oil having flowed into the lower oil chamber 47 is supplied to the inner peripheral passage 56 of the circulation oil chamber 55 through the lower oil groove 61.

As has been described, the thrust collar 21 rotating together with the rotating shaft member 12 forms a flow of lubricating oil passing through the circulation oil chamber 55 and a flow of lubricating oil passing through the cooling portion 26, between the upper oil chamber 46 and the lower oil chamber 47. In other words, a flow of lubricating oil circulating between the upper oil chamber 46 and the lower oil chamber 47 is formed. As a result, the lubricating oil repeats cooling of the thrust bearing portion 23 and journal bearing portion 25, and the heat dissipation in the cooling portion 26. This enables lubrication and cooling of the thrust bearing portion 23 and journal bearing portion 25 of the vertical bearing device 10, and heat dissipation of lubricating oil having absorbed heat from the cooling.

In the aforementioned first embodiment, the lubricating oil passage portion 51 constituting the cooling portion 26 is exposed to the outside. Hence, the lubricating oil flowing through the lubricating oil passage portion 51 loses heat in the radiating portion 52 in the lubricating oil passage portion 51 exposed to the outside of the casing 24. Thus, the lubricating oil having absorbed heat of the thrust bearing portion 23 and the journal bearing portion 25 is cooled in the cooling portion 26 while moving from the upper oil chamber 46 to the lower oil chamber 47. As a result, the circulating lubricating oil prompts cooling of the heated thrust bearing portion 23 and journal bearing portion 25. Additionally, the lubricating oil passage portion 51 of the cooling portion 26 is provided integrally with the casing 24, on the radially outer side of the casing 24. For this reason, the cooling portion 26 does not require long piping. Hence, cooling capacity can be enhanced without complicating structure and maintenance.

Moreover, the first embodiment includes the air blowing portion 53. The air blowing portion 53 forms a flow of air toward the cooling portion 26, by the fan portion 54 that rotates together with the rotating shaft member 12. Accordingly, cooling of the cooling portion 26 is prompted by the flow of air formed by the fan portion 54. Hence, it is possible to prompt heat dissipation of lubricating oil circulating through the cooling portion 26, and to prompt cooling of the thrust bearing portion 23 and journal bearing portion 25 by lubricating oil.

In the first embodiment, the thrust bearing portion 23 and the journal bearing portion 25 are provided in the circulation oil chamber 55, through which the lubricating oil circulating from the lower oil chamber 47 to the upper oil chamber 46 flows. Hence, the thrust bearing portion 23 and the journal bearing portion 25 that generate heat from supporting rotation of the rotating shaft member 12 are cooled by the lubricating oil flowing through the circulation oil chamber 55. Accordingly, it is possible to prompt cooling of the thrust bearing portion 23 and journal bearing portion 25, and suppress seizing. Hence, an anti-seize property of the vertical bearing device 10 can be improved.

Additionally, the first embodiment includes the circulation system part 70. In the circulation system part 70, multiple circulation holes 71 are formed in the annular portion 33 of the thrust collar 21. When the annular portion 33 of the thrust collar 21 rotates together with the rotating shaft member 12, centrifugal force and shear force, or differential pressure caused by difference in flow rate, for example, are generated in the lubricating oil in the circulation oil chamber 55. With this, the lubricating oil in the circulation oil chamber 55 is guided from inner to outer sides of the annular portion 33, through the circulation holes 71 penetrating the annular portion 33. The flow of lubricating oil guided by the circulation holes 71 forms a flow of lubricating oil directed toward the upper oil chamber 46, from the lower oil chamber 47 through the circulation oil chamber 55. As a result, the lubricating oil stored in the lower oil chamber 47 is circulated to the upper oil chamber 46 through the circulation oil chamber 55, by rotation of the thrust collar 21. Accordingly, it is possible to prompt circulation of lubricating oil without using a pump device or the like. Then, the thrust bearing portion 23 and journal bearing portion 25 are lubricated and cooled by the circulating flow of lubricating oil. Hence, seizing of the thrust bearing portion 23 and journal bearing portion 25 can be suppressed.

In the first embodiment, the circulation hole 71 is tilted upward from inner to outer sides. Hence, the flow of lubricating oil passing through the circulation hole 71 is directed upward, that is, toward the upper oil chamber 46, when the lubricating oil flows out of the circulation hole 71. This allows the lubricating oil having passed the circulation hole 71 to be easily guided to the upper oil chamber 46. Accordingly, it is possible to prompt the flow of lubricating oil having passed the circulation hole 71, and to thereby prompt circulation of the lubricating oil. Additionally, the circulation hole 71 penetrates the annular portion 33 of the thrust collar 21. The thrust bearing portion 23 is provided on the lower end of the annular portion 33. Since lubricating oil flows through the circulation hole 71, the thrust bearing portion 23 is cooled by the lubricating oil flowing through the circulation hole 71. Hence, it is also possible to prompt cooling of the thrust bearing portion 23 and thrust collar 21.

In the first embodiment, in the outer peripheral passage 57, the distance between the faces 572 and 574 above the virtual line L is set larger than the distance between the faces 571 and 573 below the virtual line L. The flow rate of lubricating oil passing through the circulation hole 71 is higher than the flow rate of lubricating oil passing through the thrust bearing portion 23. Hence, the flow of lubricating oil passing through the circulation hole 71 and flowing toward the upper oil chamber 46 draws up the lubricating oil passing through the thrust bearing portion 23. As a result, on the upper side of the virtual line L, lubricating oil having passed through the thrust bearing portion 23 flows together with lubricating oil having passed through the circulation hole 71. For this reason, the distance is increased on the upper side of the virtual line L, so that the lubricating oil having an increased flow rate does not accumulate and flows toward the upper oil chamber 46. Hence, it is possible to prompt circulation of lubricating oil.

In the first embodiment, the casing 24 has the curved face portion 72 on a wall face provided higher than the intersection point P with the virtual line L. Lubricating oil having flowed out of the circulation hole 71 is guided smoothly by the curved face portion 72, to the upper oil chamber 46 on the upper side. Accordingly, resistance in the circulation path of lubricating oil is reduced, and circulation of the lubricating oil can be prompted.

In the first embodiment, the connection hole 73 provided in the middle wall 42 of the casing 24 connects the circulation oil chamber 55 and the upper oil chamber 46. The connection hole 73 is formed into a tapered shape whose sectional area increases continuously toward the upper oil chamber 46, from the outer peripheral passage 57 side of the circulation oil chamber 55. Hence, the lubricating oil on the circulation oil chamber 55 side is guided by the connection hole 73 having the increasing sectional area, and is moved to the upper oil chamber 46. Accordingly, it is possible to prompt circulation of lubricating oil without increasing resistance.

In the first embodiment, the inner peripheral face 732 of the connection hole 73 is parallel to the center axis of the rotating shaft member 12. Accordingly, a flow directed toward the upper oil chamber 46 on the upper side is formed in the lubricating oil passing through the connection hole 73, and therefore the flow is less likely to be disturbed. Hence, it is possible to suppress increase in resistance due to flow disturbance, and to prompt circulation of lubricating oil.

The first embodiment includes the seal member 77. The seal member 77 restricts the flow of lubricating oil between the outer peripheral passage 57 and the journal chamber 59. If lubricating oil flows from the journal chamber 59 to the outer peripheral passage 57, lubrication of the journal bearing portion 25 accommodated in the journal chamber 59 may become insufficient. On the other hand, if lubricating oil flows from the outer peripheral passage 57 to the journal chamber 59, the lubricating oil heated from cooling the thrust bearing portion 23 may flow into the journal bearing portion 25 and raise the temperature of the journal bearing portion 25. Hence, by providing the seal member 77, the flow of lubricating oil between the outer peripheral passage 57 and the journal chamber 59 can be blocked. It is therefore possible to prompt circulation of lubricating oil without hindering lubrication and cooling of the journal bearing portion 25.

In the first embodiment, the seal member 77 may serve as a secondary thrust bearing portion. In this configuration, the rotating shaft member 12 is supported by the seal member 77 serving as the thrust bearing portion 23 and the secondary thrust bearing portion. Hence, it is possible to more stably support the rotating shaft member 12 and prompt circulation of lubricating oil, without increasing the number of parts.

The first embodiment includes the introduction portion 78 to the inlet of the circulation hole 71, and the introduction portion 79 to the inlet of the journal through hole 76. The introduction portions 78 and 79 are set such that their inner diameter decrease toward the circulation hole 71 and the journal through hole 76. With this, the introduction portions 78 and 79 guide lubricating oil in the inner peripheral passage 56 to the circulation hole 71 and the journal through hole 76. In other words, the lubricating oil in the inner peripheral passage 56 is guided by these introduction portions 78 and 79 to be introduced into the circulation hole 71 and journal through hole 76. This prompts the flow of lubricating oil from the inner peripheral passage 56 to the circulation hole 71 and the journal through hole 76. Hence, it is possible to prompt circulation of lubrication oil.

Modification of First Embodiment

Figure 10:
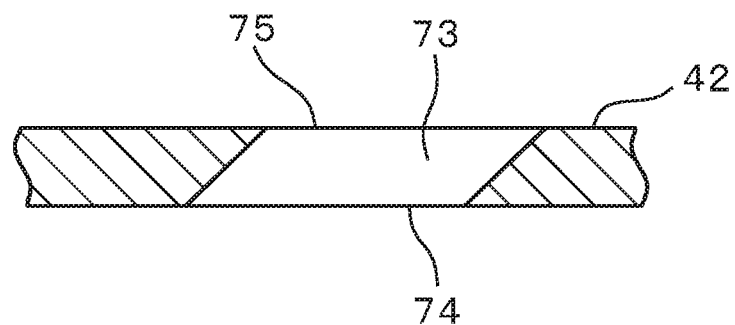
FIG. 10 is a cross-sectional view of the vicinity of a connection hole of a modification of the first embodiment, cut along a position corresponding to line VIII-VIII of FIG. 7.
Figure 11:
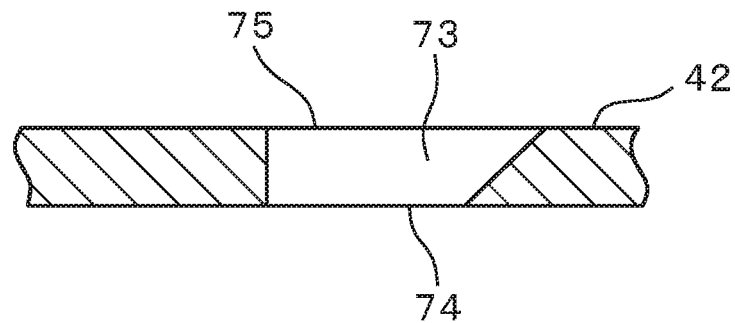
FIG. 11 is a cross-sectional view of the vicinity of the connection hole of the modification of the first embodiment, cut along the position corresponding to line VIII-VIII of FIG. 7.

In the aforementioned first embodiment, in the connection hole 73, tilted faces tilt in opposite directions relative to the circumferential direction of the casing 24, so as to be symmetric to each other, as illustrated in FIGS. 7 and 8. However, the connection hole 73 may be configured such that the tilted faces tilt in the same direction relative to the circumferential direction, as illustrated in FIG. 10. If the rotating shaft member 12 is configured to rotate both in the normal and reverse directions, it is preferable that the connection hole 73 be formed into the shape illustrated in FIGS. 7 and 8. Additionally, the front and rear inclinations of the connection hole 73 in the circumferential direction of the casing 24 may be the same as illustrated in FIGS. 8 and 10, or may be different as illustrated in FIG. 11. In both cases, the shape of the connection hole 73 can be set arbitrarily to control movement of lubricating oil, depending on the required performance of the vertical bearing device 10.

Second Embodiment

Figure 12:
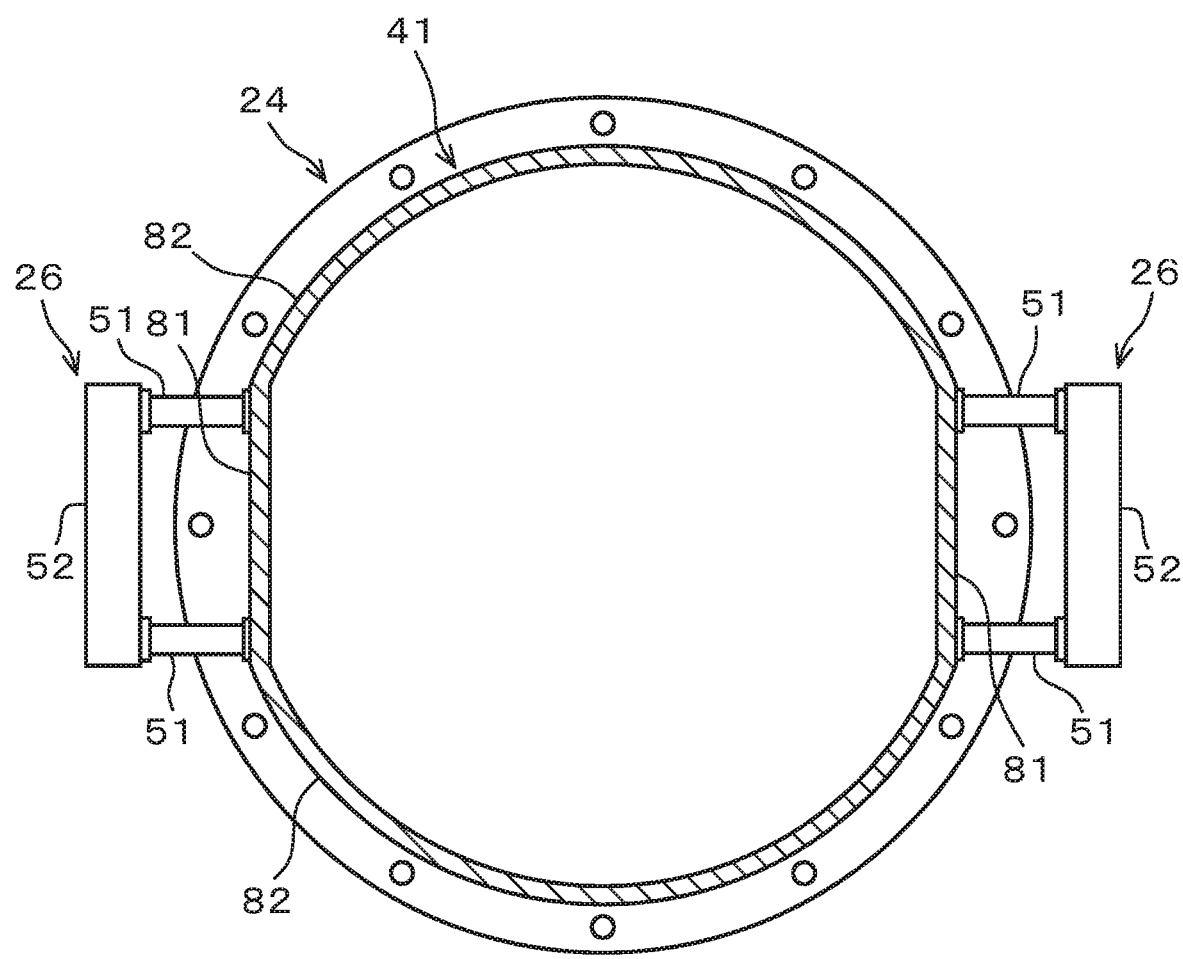
FIG. 12 is a cross-sectional view of a part of a casing and a cooling part of a vertical bearing device of a second embodiment.

FIG. 12 illustrates a vertical bearing device of a second embodiment.

FIG. 12 is a cross-sectional view in which a casing 24 is cut in an intermediate part thereof in the axial direction, and from which a middle wall 42, an inner wall 43, and other parts are omitted. In the second embodiment, a casing main body 41 constituting an outer wall of the casing 24 has a plane portion 81 extending flat in the circumferential direction. That is, the casing main body 41 has the plane portion 81 flat in the circumferential direction, and an annular portion 82 that connects the plane portions 81 in the circumferential direction. The annular portion 82 is formed into an annular shape that is concentric with the rotating shaft member 12. That is, the annular portion 82 is formed into a curved face that is arc shaped in sections such as those illustrated in FIG. 12. In the second embodiment, the casing main body 41 has two plane portions 81 and two annular portions 82.

In the second embodiment, a cooling portion 26 is provided on the plane portion 81 of the casing main body 41. That is, a lubricating oil passage portion 51 constituting the cooling portion 26 is exposed to the outside of the casing main body 41 from the plane portion 81, in the casing main body 41. In addition, a radiating portion 52 constituting the cooling portion 26 is provided in a position facing the plane portion 81. The two cooling portions 26 of the second embodiment are respectively provided on the two plane portions 81 of the casing main body 41.

By providing the cooling portion 26 on the plane portion 81 as in the second embodiment, an air flow formed by a fan portion 54 flows evenly into a gap between the cooling portion 26 and the plane portion 81. When the planar cooling portion 26 is provided on the arc-shaped casing main body 41 as in the aforementioned first embodiment, the distance between the cooling portion 26 and the casing main body 41 varies in the circumferential direction of the casing main body 41. That is, when the arc-shaped casing main body 41 and the planar cooling portion 26 face each other, the distance between the casing main body 41 and the cooling portion 26 is larger on both end sides in the circumferential direction of the casing main body 41. On the other hand, the distance between the casing main body 41 and the cooling portion 26 is smaller in a middle part in the circumferential direction of the casing main body 41. Thus, when the arc-shaped casing main body 41 and the planar cooling portion 26 face each other, the sectional area through which air generated by the fan portion 54 passes through varies in the circumferential direction of the casing main body 41.

Meanwhile, in the second embodiment, the cooling portion 26 and the plane portion 81 are arranged substantially parallel to each other. Hence, the sectional area of the space through which air passes is substantially even in the circumferential direction of the casing main body 41. With this, the air flow formed by the fan portion 54 passes through the cooling portion 26 evenly. Consequently, cooling efficiency of the cooling portion 26 can be enhanced.

Additionally, in the second embodiment, the cooling portion 26 is attached to the planar plane portion 81 in the casing main body 41. Hence, work for positioning and fixing the cooling portion 26 is made simpler than when providing it on the curved annular portion 82. As a result, it is possible to improve work efficiency in assembling the cooling portion 26 onto the casing main body 41.

As has been described, in the second embodiment, the plane portion 81 is formed in the casing main body 41, and the cooling portion 26 is provided on the plane portion 81. Hence, the flow of cooling air formed by the fan portion 54 passes through the cooling portion 26 evenly. Accordingly, cooling efficiency of the cooling portion 26 is improved, and the cooling portion 26 can be downsized.

Moreover, in the second embodiment, the cooling portion 26 is provided on the flat plane portion 81, so that workability of assembling the cooling portion 26 onto the casing main body 41 can also be improved.

Modification of Second Embodiment

The second embodiment illustrated in FIG. 12 describes an example of forming two plane portions 81 in the casing main body 41, and providing the cooling portions 26 on each of the two plane portions 81.

Figure 13:
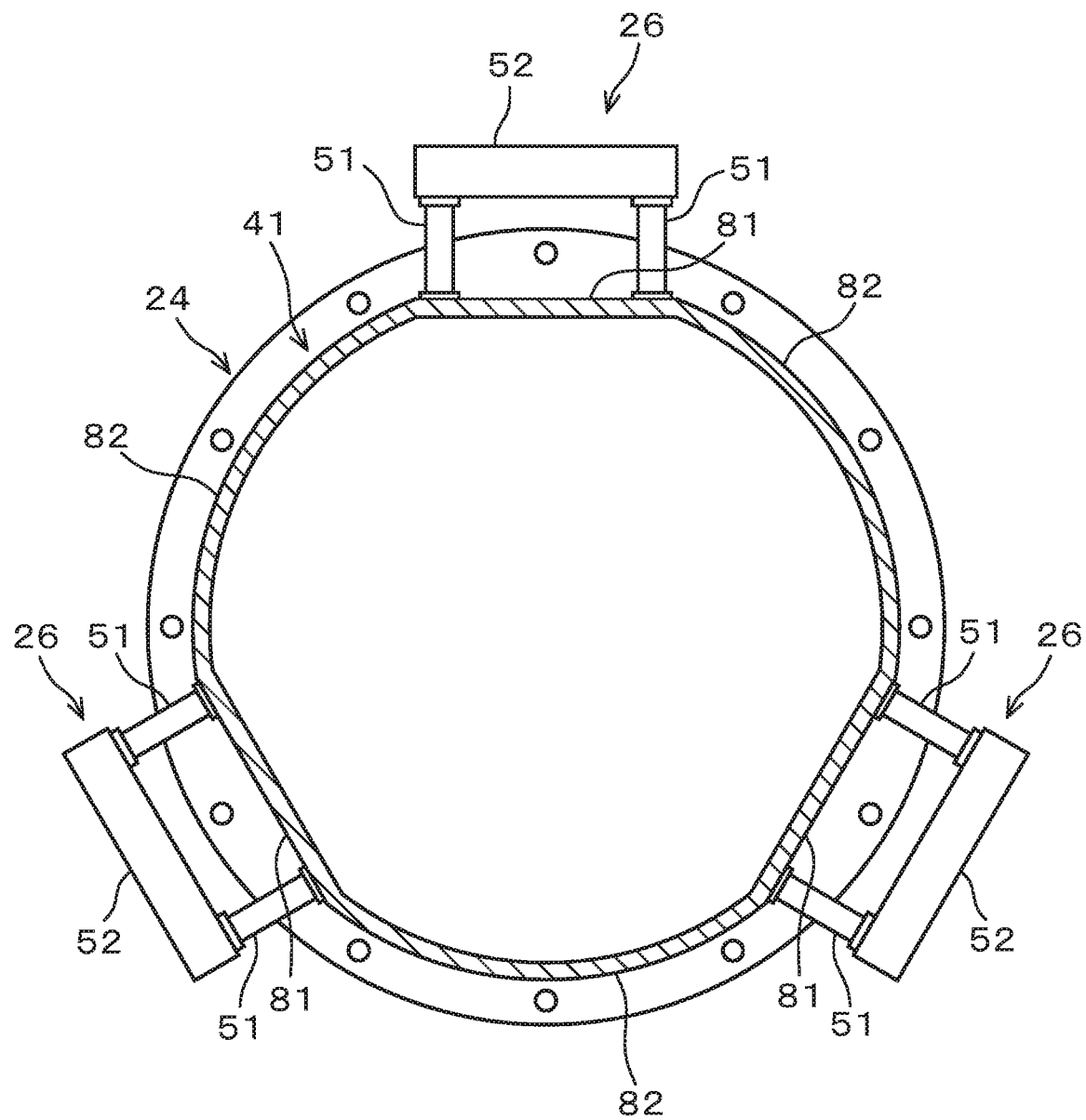
FIG. 13 is a cross-sectional view of a part of a casing and a cooling part of a vertical bearing device of a modification of the second embodiment.
Figure 14:
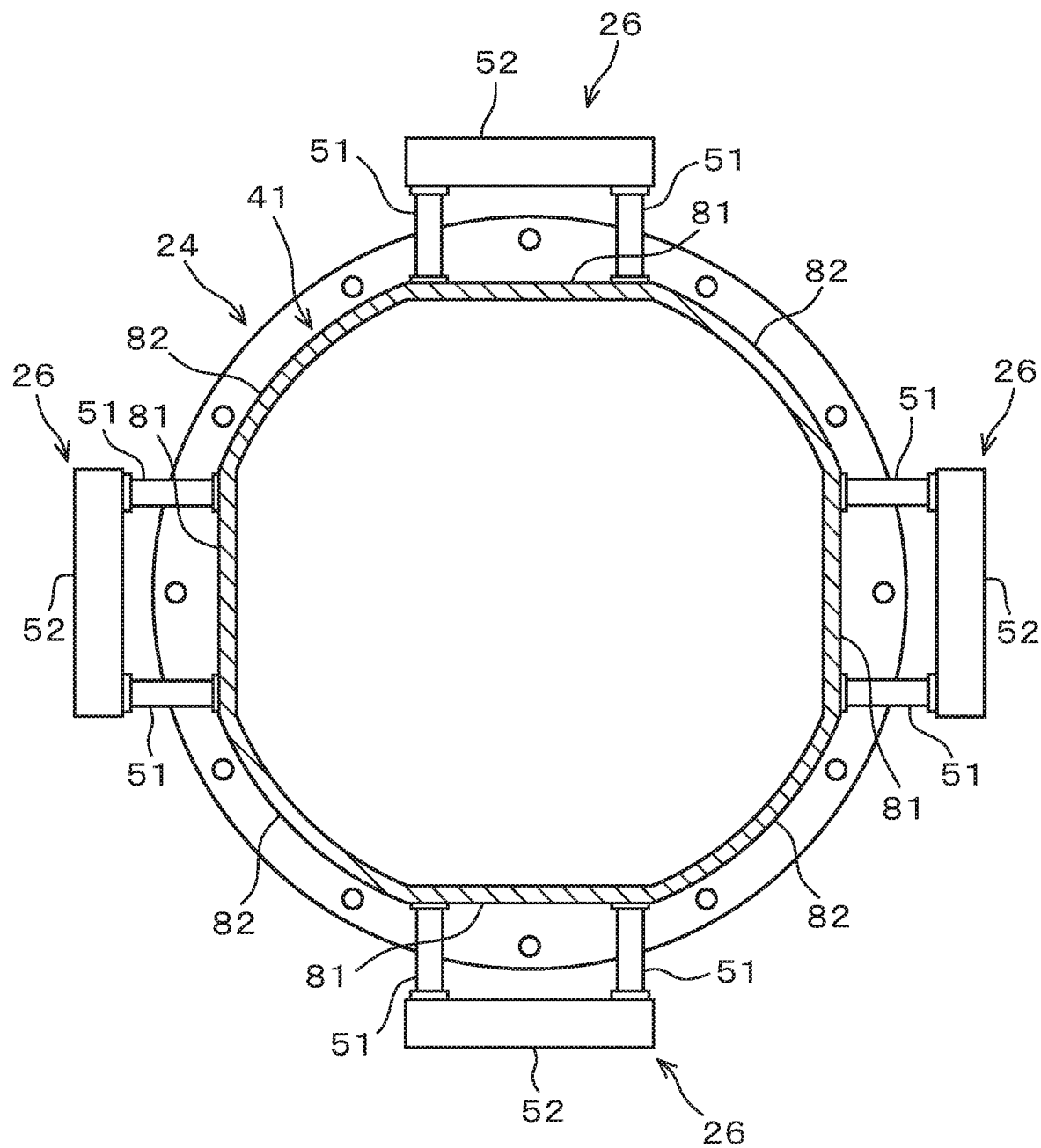
FIG. 14 is a cross-sectional view of a part of a casing and a cooling part of a vertical bearing device of a modification of the second embodiment.
Figure 15:
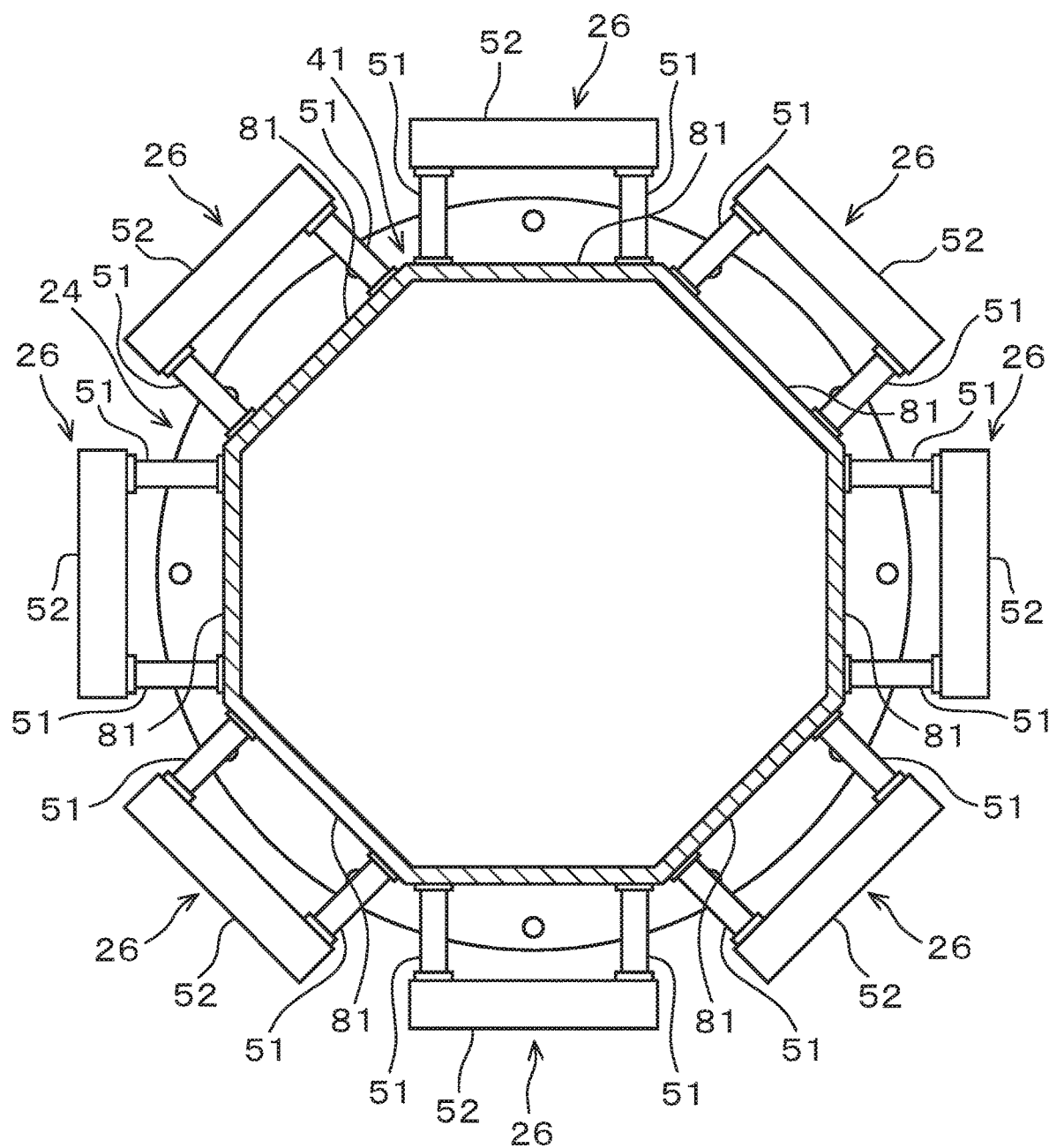
FIG. 15 is a cross-sectional view of a part of a casing and a cooling part of a vertical bearing device of a modification of the second embodiment.

However, the casing main body 41 may have three plane portions 81 as illustrated in FIG. 13. In a vertical bearing device 10 illustrated in FIG. 13, a cooling portion 26 may be provided on each of the three plane portions 81. Instead, a casing main body 41 may have four plane portions 81 as illustrated in FIG. 14, or may be configured only of plane portions 81, as illustrated in FIG. 15.

Thus, any number of plane portions 81 may be provided in the casing main body 41. Then, by providing the cooling portion 26 on all or any of the plane portions 81, more cooling portions 26 can be provided, and cooling efficiency can be improved even more. Additionally, as has been described in the second embodiment, since the cooling portion 26 is provided on the plane portion 81, attachment of the cooling portion 26 onto the casing main body 41 is made easier. Hence, even when more cooling portions 26 are provided to improve cooling efficiency, attachment of the cooling portion 26 onto the plane portion 81 can drastically reduce man-hours.

Third Embodiment

Figure 16:
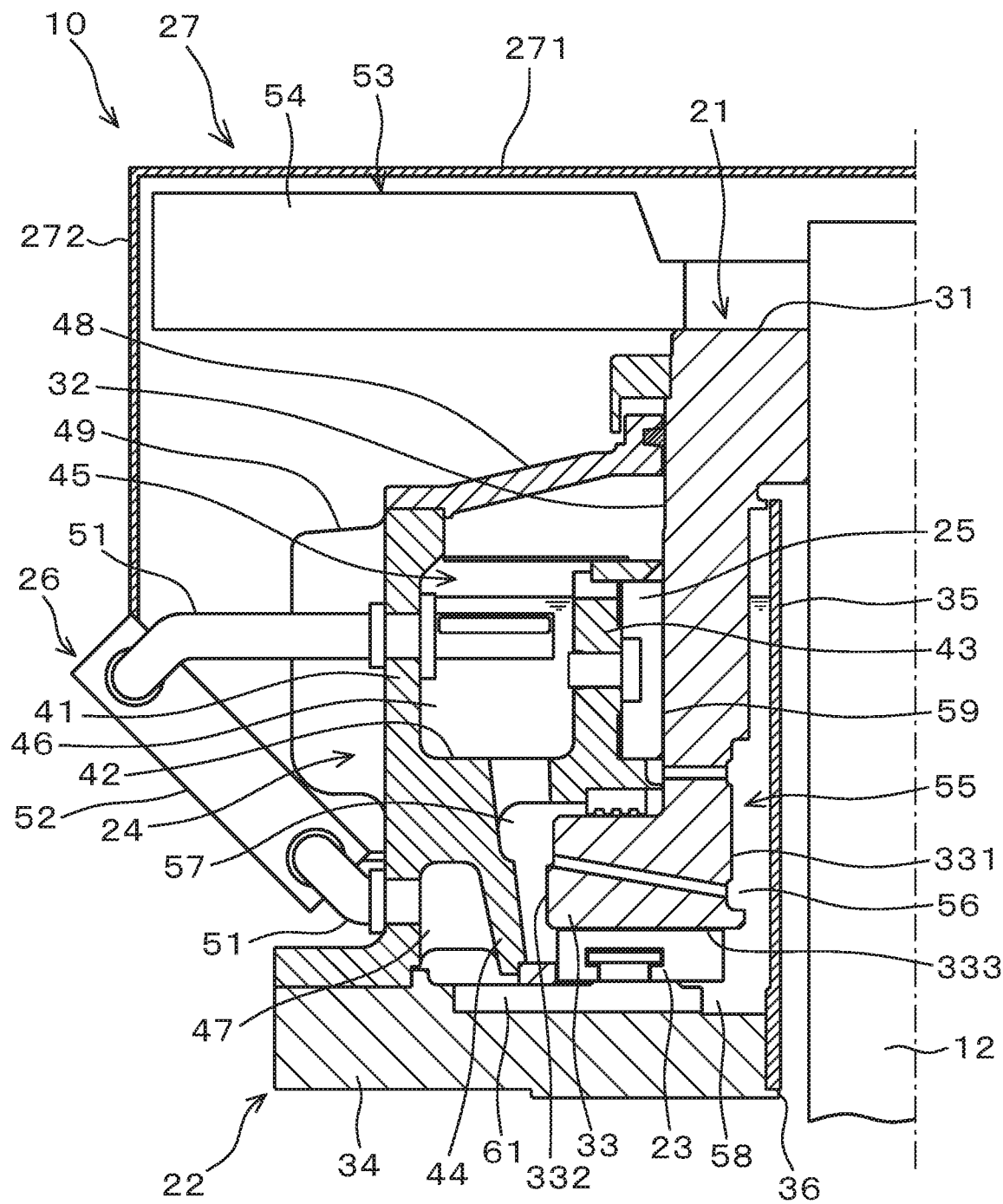
FIG. 16 is a schematic diagram of a section of a vertical bearing device of a third embodiment.

FIG. 16 illustrates a vertical bearing device of a third embodiment.

In the third embodiment, a radiating portion 52 of a cooling portion 26 is tilted relative to the axial direction of a rotating shaft member 12. In other words, the radiating portion 52 is not parallel to the rotating shaft member 12, but is tilted relative thereto. When the radiating portion 52 is provided parallel to the rotating shaft member 12, that is, provided as in the first embodiment, a flow of air formed by a fan portion 54 passes through between the radiating portion 52 and a casing main body 41 in the axial direction. Then, the flow of cooling air having passed through between the radiating portion 52 and the casing main body 41 is curved radially outward by the base plate 22. For this reason, the air flow formed by the fan portion 54 is more likely to flow on the lower side of the radiating portion 52 than on the upper side thereof. Accordingly, lubricating oil is cooled mainly on the lower side of the radiating portion 52, and a radiating surface of the radiating portion 52 cannot be fully used in many cases.

Hence, by tilting the radiating portion 52 as in the third embodiment, the air flow formed by the fan portion 54 can be spread more easily over the entire radiating portion 52. In other words, the air flow formed by the fan portion 54 is more likely to flow into the entire radiating portion 52 than when the radiating portion 52 is parallel to the axis. Hence, it is possible to prompt cooling of lubricating oil without expanding the area of the radiating portion 52. Accordingly, cooling efficiency of the radiating portion 52 can be improved.

Figure 17:
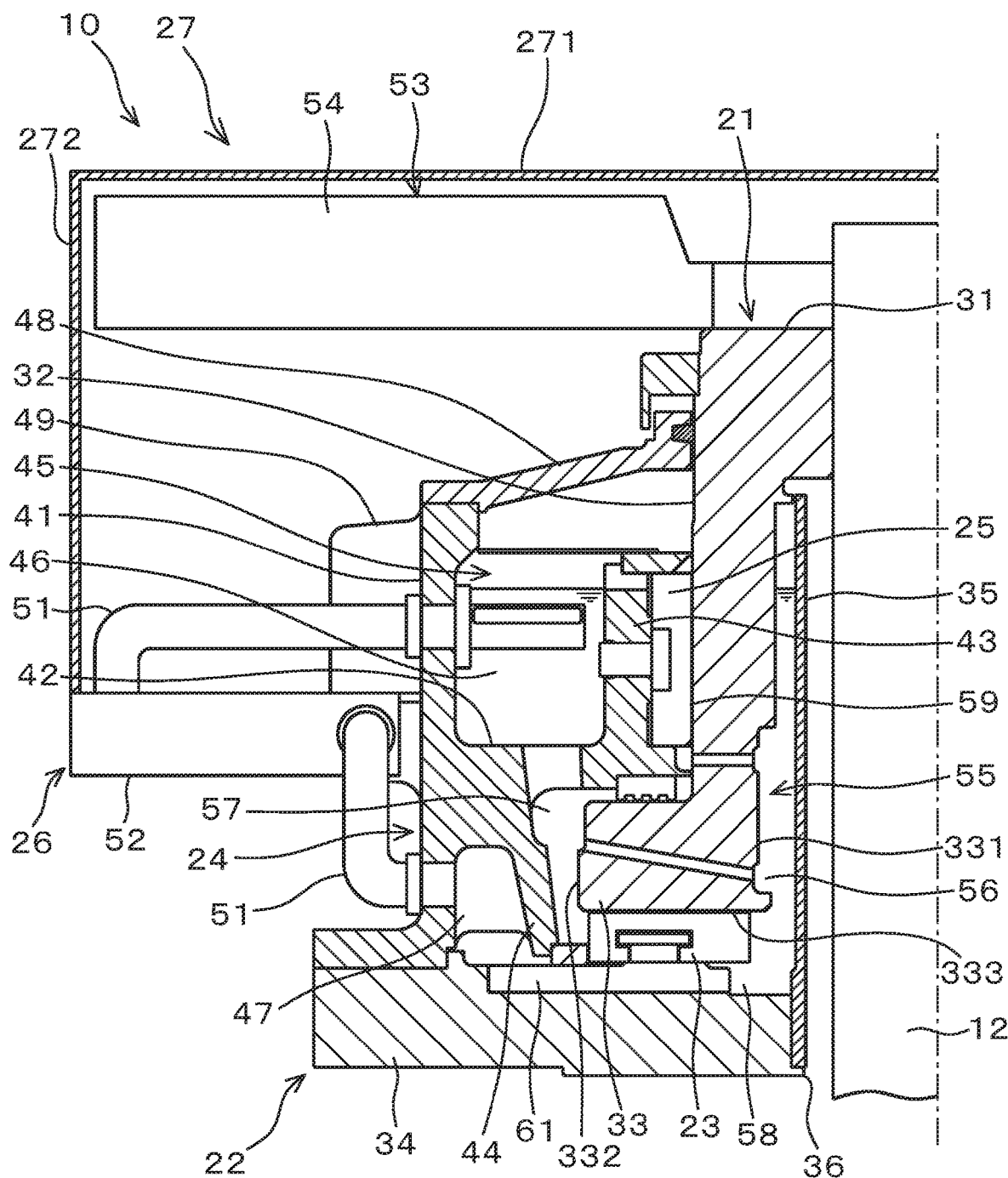
FIG. 17 is a schematic diagram of a section of a vertical bearing device of a modification of the third embodiment.

Incidentally, the radiating portion 52 may be provided perpendicular to the axial direction of the rotating shaft member 12, as illustrated in FIG. 17. In other words, the radiating portion 52 forms a 90-degree angle with the rotating shaft member 12. By thus arranging the radiating portion 52 perpendicular to the axis of the rotating shaft member 12, the air flow formed by the fan portion 54 passes through the entire radiating portion 52 substantially evenly. Hence, it is possible to prompt cooling of lubricating oil without expanding the area of the radiating portion 52. Accordingly, cooling efficiency of the radiating portion 52 can be improved even more.

Fourth Embodiment

Figure 18:
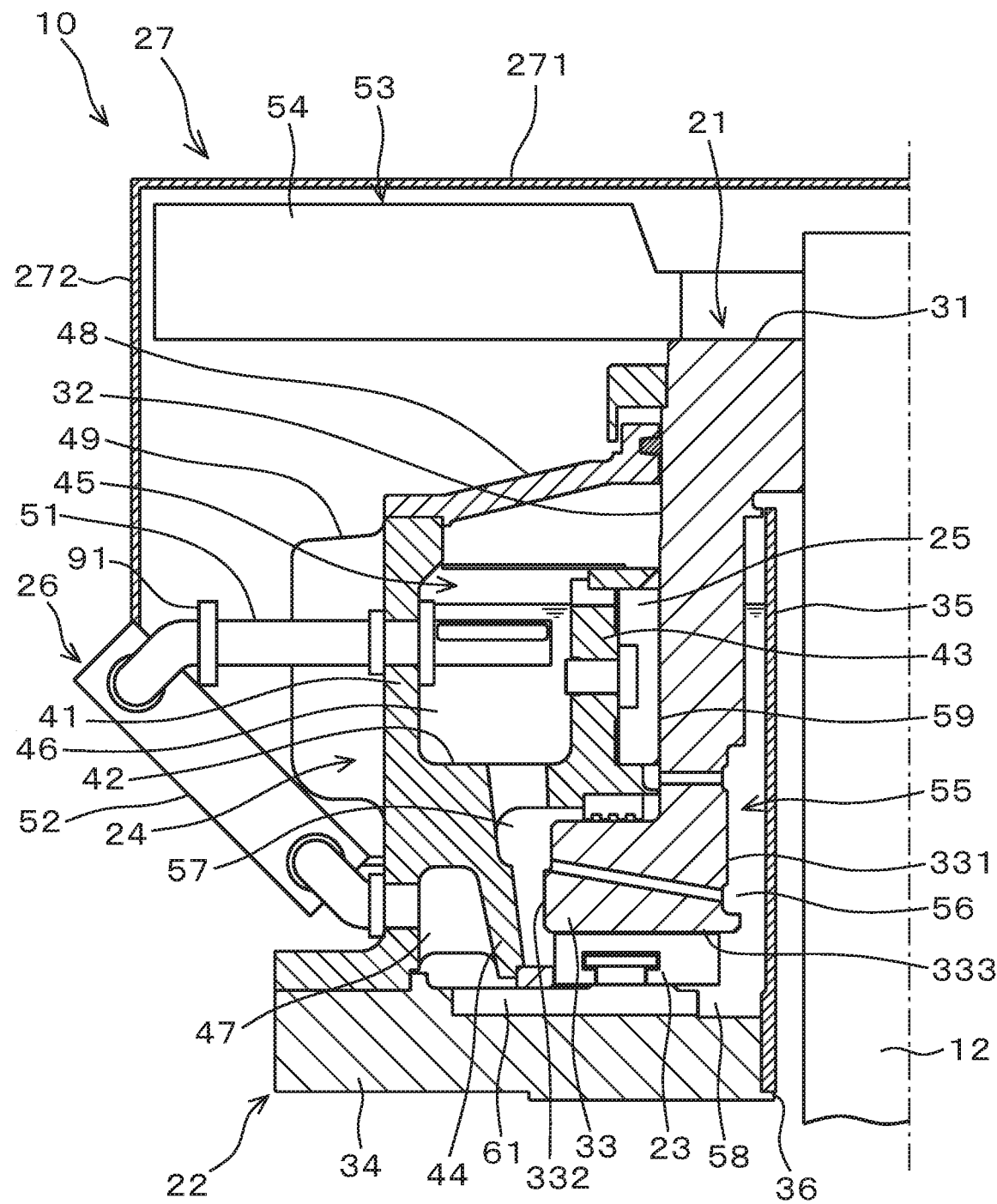
FIG. 18 is a schematic diagram of a section of a vertical bearing device of a fourth embodiment.

FIG. 18 illustrates a vertical bearing device of a fourth embodiment.

In the fourth embodiment, a cooling portion 26 has a straightening vane 91. The straightening vane 91 is provided on an inlet side, where air flows into a radiating portion 52 from a fan portion 54. In the fourth embodiment, the straightening vane 91 is provided in a lubricating oil passage portion 51 connected to an upper oil chamber 46. Specifically, the straightening vane 91 is provided in a part where the lubricating oil passage portion 51 extending from the upper oil chamber 46 connects to the radiating portion 52. By providing the straightening vane 91, an air flow formed by the fan portion 54 is aligned by the straightening vane 91. That is, the straightening vane 91 cancels disturbance in the air flow formed by the fan portion 54, and guides a stable air flow to enter the radiating portion 52. Hence, a less disturbed air flow passes through the radiating portion 52.

In the fourth embodiment, the air flow formed by the fan portion 54 is aligned by the straightening vane 91, and is guided to the radiating portion 52. With this, the flow of air passing through the radiating portion 52 is stabilized. Hence, cooling efficiency can be improved.

Fifth Embodiment

Figure 19:
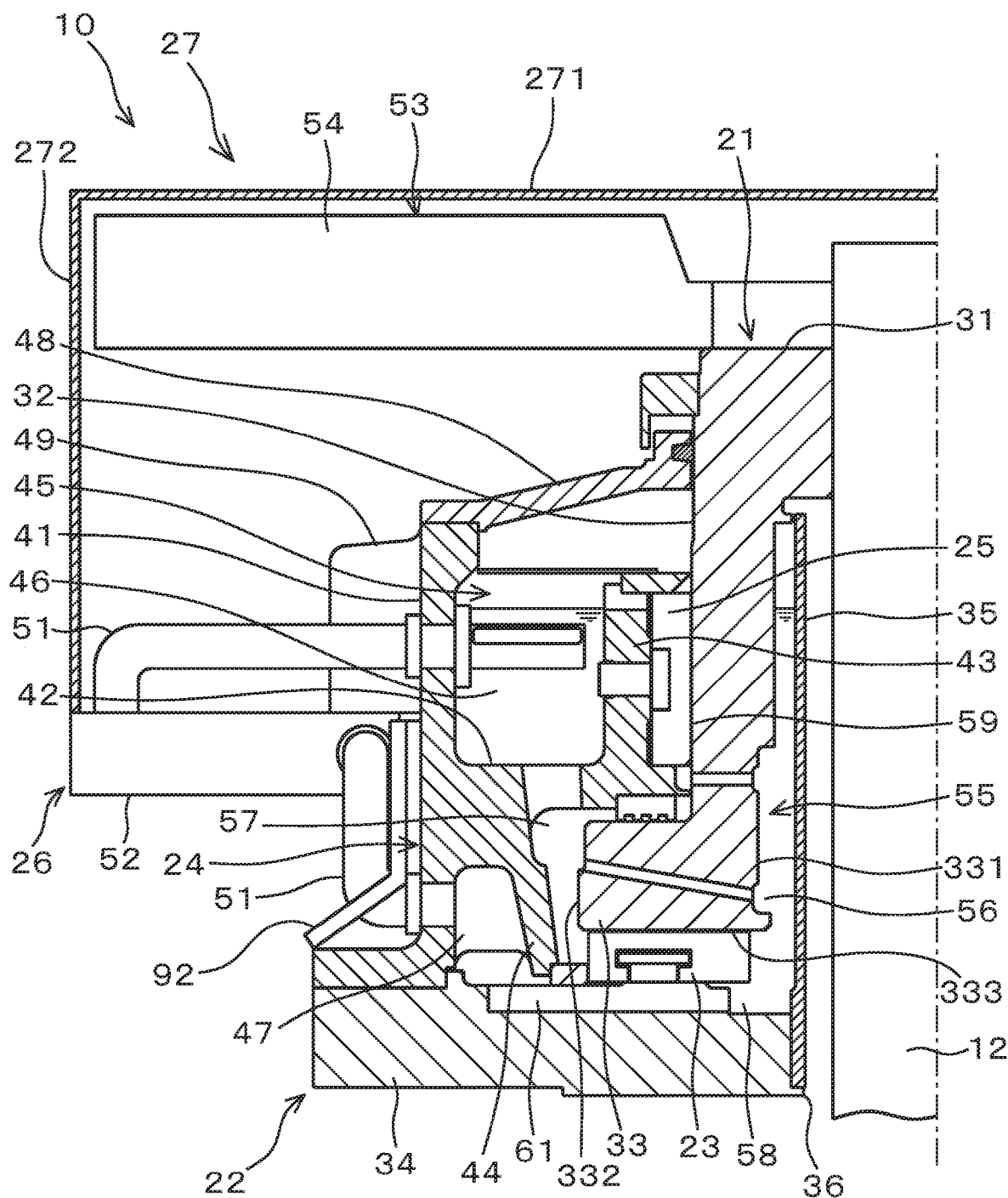
FIG. 19 is a schematic diagram of a section of a vertical bearing device of a fifth embodiment.

FIG. 19 illustrates a vertical bearing device of a fifth embodiment.

A vertical bearing device 10 of the fifth embodiment includes a shielding plate 92. The shielding plate 92 is provided between a cooling portion 26 and a casing 24. The shielding plate 92 blocks transmission of heat from the cooling portion 26 to the casing 24. When the radiating portion 52 is tilted relative to the axis of the rotating shaft member 12 as in the third embodiment illustrated in FIGS.

16 and 17, the distance between the radiating portion 52 and the casing 24 is reduced in some parts. When the radiating portion 52 and the casing 24 thus come close, heat may be transmitted from the heated radiating portion 52 to the casing 24. For this reason, the shielding plate 92 is provided between the radiating portion 52 and the casing 24. With this, heat of the radiating portion 52 is shielded by the shielding plate 92, and transmission thereof to the casing 24 can be suppressed.

In the fifth embodiment, the shielding plate 92 is provided to suppress transmission of heat from the radiating portion 52 to the casing 24. Accordingly, it is possible to suppress deterioration in cooling capacity, even when the tilted radiating portion 52 is brought close to the casing 24.

Sixth Embodiment

Figure 20:
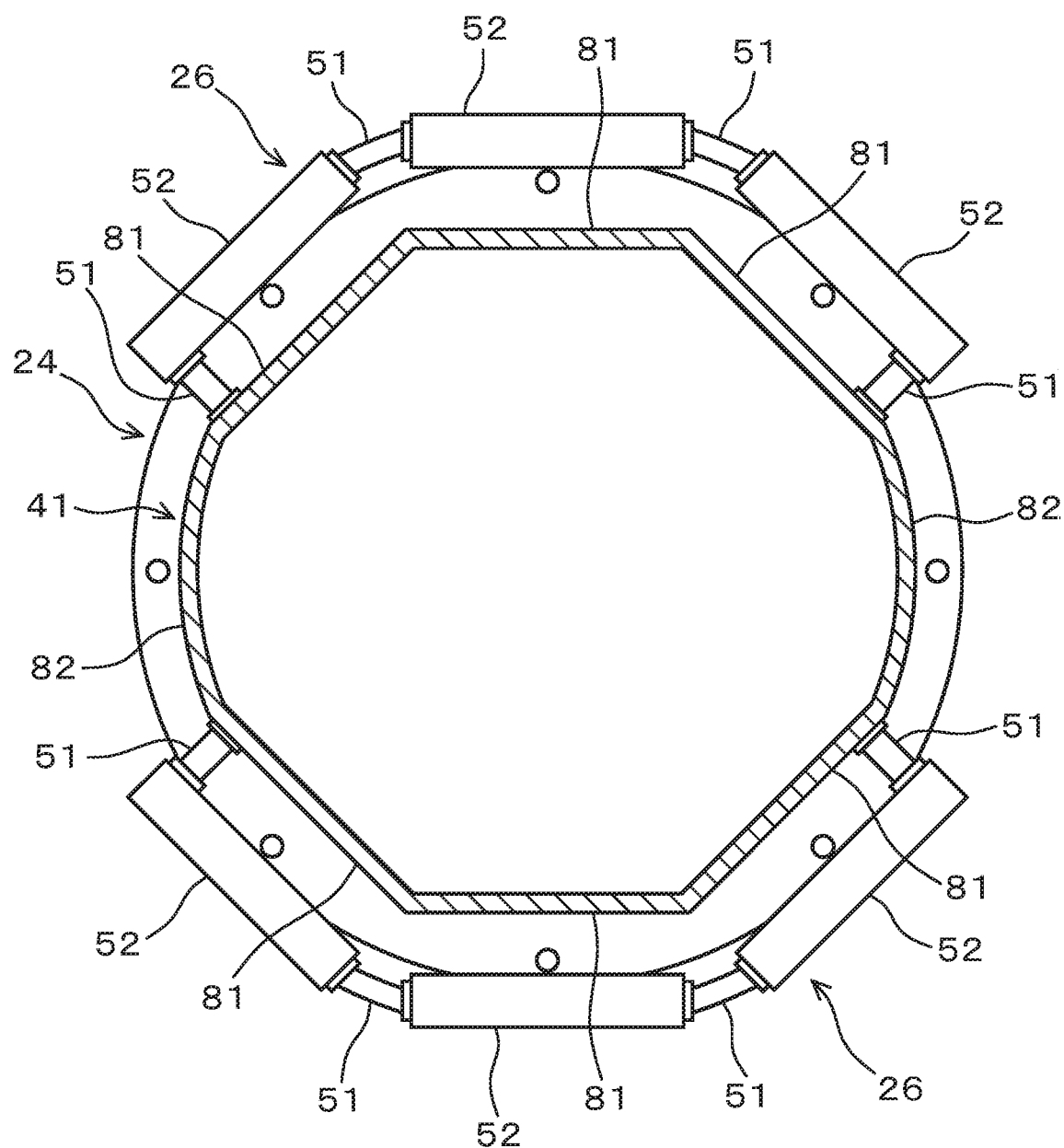
FIG. 20 is a cross-sectional view of a part of a casing and a cooling part of a vertical bearing device of a sixth embodiment.

FIG. 20 illustrates a vertical bearing device of a sixth embodiment.

In the sixth embodiment, a cooling portion 26 has a lubricating oil passage portion 51, and multiple radiating portions 52. The lubricating oil passage portion 51 is exposed to the outside of a casing main body 41 from an upper oil chamber 46, and consecutively passes through multiple radiating portions 52 before connecting to a lower oil chamber 47. That is, the lubricating oil passage portion 51 consecutively passes through multiple serially-arranged radiating portions 52. Hence, lubricating oil having flowed into the lubricating oil passage portion 51 from the upper oil chamber 46 passes through the serial radiating portions 52, and is thereby cooled in multiple steps. Then, the lubricating oil cooled by the multiple radiating portions 52 flows into the lower oil chamber 47.

In the sixth embodiment, cooling of the lubricating oil flowing through the lubricating oil passage portion 51 is prompted, by allowing the lubricating oil to consecutively pass through multiple radiating portions 52. Then, in the sixth embodiment, even when multiple radiating portions 52 are provided, only two holes, which are an inlet and an outlet, need to be formed in the casing main body 41 to allow passage of the lubricating oil. For example, when the radiating portion 52 is arranged in front of each of six plane portions 81 provided in the casing main body 41, six lubricating oil passage portions 51 need to be connected to the casing main body 41. In this case, two holes for one lubricating oil passage portion 51, that is, a total of 12 holes need to be formed in the casing main body 41 to allow passage of the lubricating oil. Meanwhile, in the sixth embodiment, even when six radiating portions 52 are provided, only two lubricating oil passage portions 51 are used, and therefore, a total of four holes are formed in the casing main body 41. Thus, in the sixth embodiment, less holes need to be formed in the casing main body 41 to allow passage of lubricating oil. This reduces man-hours and required parts of the casing main body 41. Hence, the structure can be simplified while maintaining the cooling capacity.

Other Embodiments

The present invention described above is not limited to the above embodiments, and is applicable to various embodiments without departing from the gist of the invention.

The third embodiment describes a configuration in which the radiating portion 52 is tilted to widen the upper side in the axial direction of the rotating shaft member 12. However, reversely, the radiating portion 52 may be tilted to widen the lower side in the axial direction of the rotating shaft member 12. In this case, it is preferable that the shielding plate 92 of the fourth embodiment be provided on the upper side of the radiating portion 52 that comes close to the casing main body 41. Moreover, the connection between the radiating portion 52 and the lubricating oil passage portion 51 is not limited to the above examples. For example, in the example of FIG. 17, the lubricating oil passage portion 51 connects to the radially outer side of the radiating portion 52 from the upper oil chamber 46, and connects to the lower oil chamber 47 from the radially inner side of the radiating portion 52. In contrast, the lubricating oil passage portion 51 may connect to the radially inner side of the radiating portion 52 from the upper oil chamber 46, and connect to the lower oil chamber 47 from the radially outer side of the radiating portion 52. Additionally, the flow of lubricating oil may be clockwise or anticlockwise, around the rotating shaft member 12. Thus, connection between the radiating portion 52 and the lubricating oil passage portion 51, and the direction of flow of lubricating oil may be changed arbitrarily, depending on the usage of the applied radiating portion 52.

In addition, the aforementioned multiple embodiments describe an example in which lubricating oil passing through the radiating portion 52 through the lubricating oil passage portion 51 flows from the upper oil chamber 46 to the lower oil chamber 47. On the other hand, in another conceivable configuration, lubricating oil passing through the radiating portion 52 through the lubricating oil passage portion 51 may flow from the lower oil chamber 47 to the upper oil chamber 46. In this case, lubricating oil passing through the radiating portion 52 flows from the lower oil chamber 47 to the upper oil chamber 46, by a pumping effect using centrifugal force and shear force generated in the lubricating oil by rotation of the thrust collar 21. Thus, the path and direction in which lubricating oil flows in the lubricating oil passage portion 51 may be set arbitrarily, as long as the lubricating oil passes through the radiating portion 52.

Figure 21:
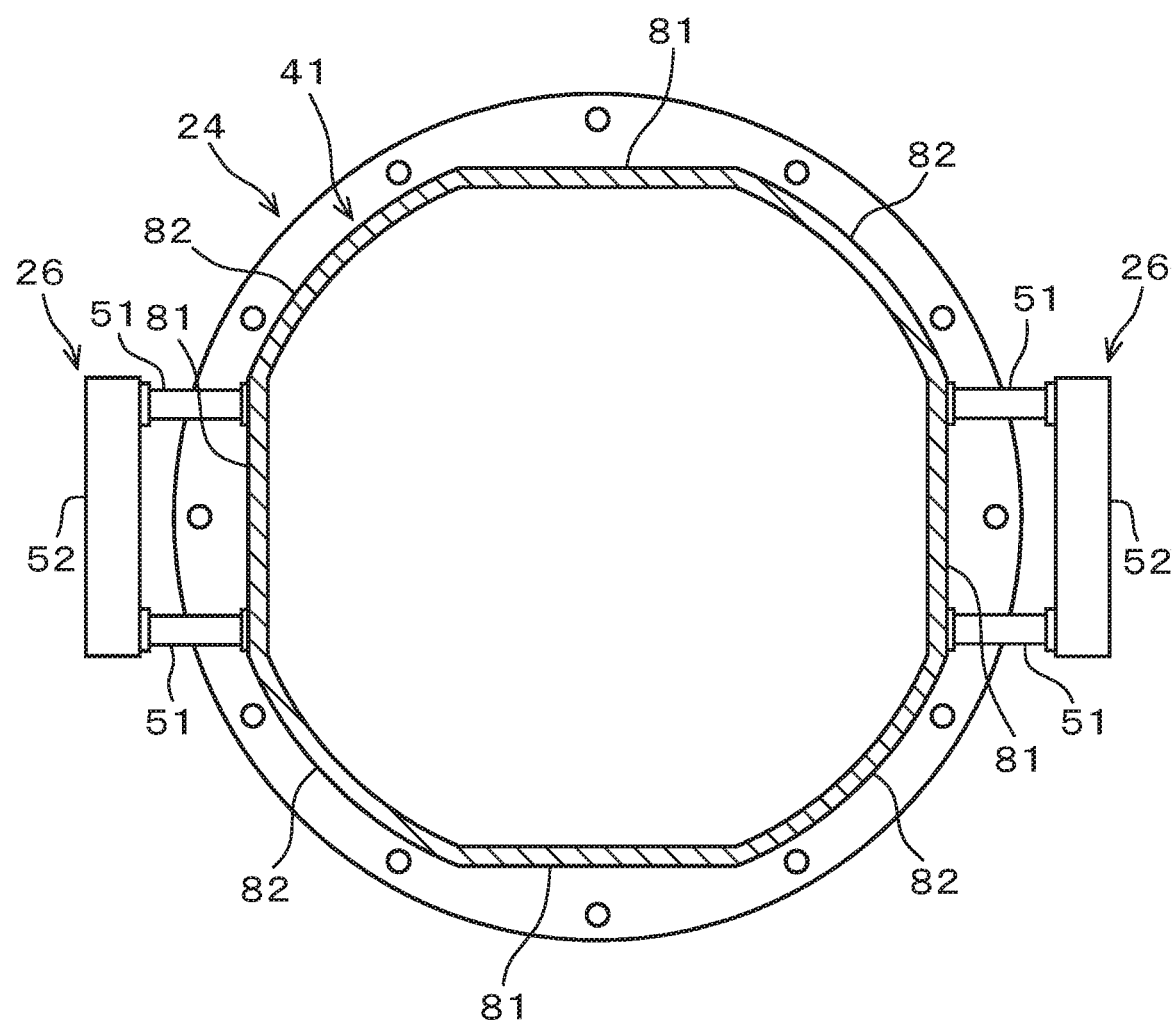
FIG. 21 is a cross-sectional view of a part of a casing and a cooling part of a vertical bearing device of another embodiment.

Moreover, the aforementioned multiple embodiments describe an example in which the plane portion 81 is provided in the casing main body 41 for attachment of the cooling portion 26. However, as illustrated in FIG. 21, the cooling portion 26 does not necessarily have to be attached on the plane portion 81 of the casing main body 41. That is, the casing main body 41 may have a plane portion 81 that does not have the cooling portion 26 attached thereon.

Seventh Embodiment

A vertical bearing device of a seventh embodiment will be described.

Figure 22:
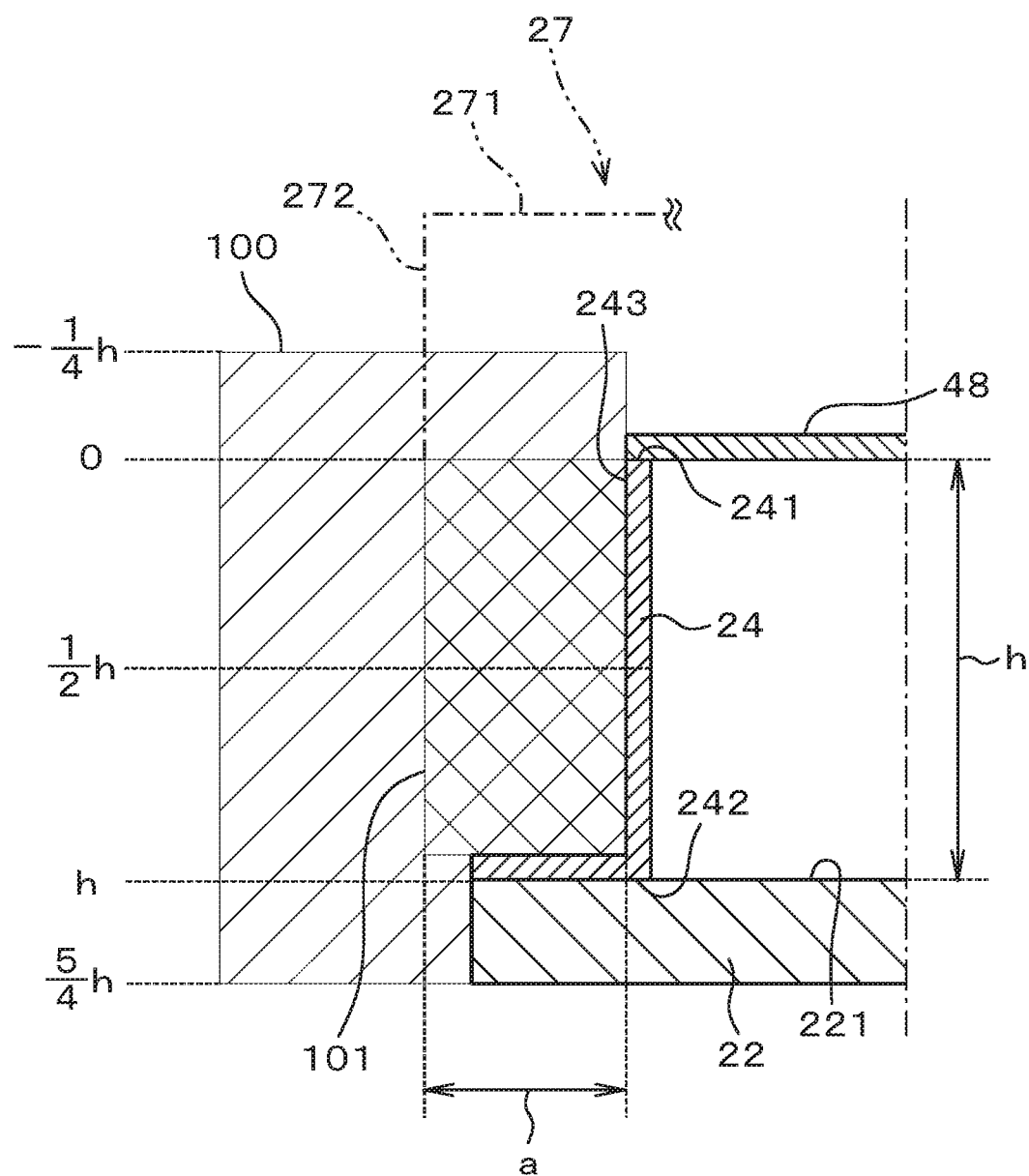
FIG. 22 is a schematic cross-sectional view of a main part of a vertical bearing device of a seventh embodiment.

In the seventh embodiment, the position of a cooling portion 26 is specified. As illustrated in FIG. 22, in the seventh embodiment, the cooling portion 26 is provided in a preset range 100. As described earlier, an oil chamber 45 is formed between a base plate 22 and a casing 24. The upper end of the oil chamber 45 coincides with an upper end face 241 of the casing 24, in the axial direction of a rotating shaft member 12. The lower end of the oil chamber 45 coincides with an upper end face 221 of the base plate 22, in the axial direction of the rotating shaft member 12. The upper end face 221 of the base plate 22 is in contact with a lower end face 242 of the casing 24. Hence, the lower end of the oil chamber 45 coincides with the upper end face 221 and the lower end face 242. When the upper and lower ends of the oil chamber 45 are defined in this manner, a distance from the upper to lower ends of the oil chamber 45 in the axial direction of the rotating shaft member 12, that is, a distance from the upper end face 241 to the lower end face 242 of the casing 24 is defined as "height h."

Additionally, the casing 24 has an outer peripheral face 243 in the radial direction of the rotating shaft member 12. A side cylinder portion 272 of a cover 27 is positioned on the outer side of the casing 24. A distance from the outer peripheral face 243 of the casing 24 to the side cylinder portion 272, that is, an inner peripheral face of the side cylinder portion 272 of the cover 27 is defined as "distance a."

When height h and distance a are defined in the above manner, the preset range 100 is set as follows. When the upper end of the oil chamber 45, that is, the upper end face 241 of the casing 24 is set as a reference point, that is, "reference point 0," the preset range 100 in the axial direction of the rotating shaft member 12 is set between −¼h and ⅝h. Specifically, the upper end of the preset range 100 is set ¼h higher than the upper end face 241 as the reference point, that is, in position −¼h relative to the reference point 0. Meanwhile, the lower end of the preset range 100 is set ¼h lower than the lower end face 242 as the lower end of the casing 24, that is, in position ⅝h relative to the reference point 0. Thus, the preset range 100 in the axial direction of the rotating shaft member 12 is set within a range of −¼h to ⅝h relative to the reference point 0. Additionally, when the outer peripheral face 243 of the casing 24 is set as a reference point, the preset range 100 in the radial direction of the rotating shaft member 12 is set to a range within distance 2a from the outer peripheral face 243. Note that the distance from the outer peripheral face 243 of the casing 24 to the cover 27 is the minimum distance within the range. That is, if the outer peripheral face 243 of the casing 24 is tilted in a cone shape, for example, "distance a" is the shortest distance between the outer peripheral face 243 and the cover 27.

Figure 23:
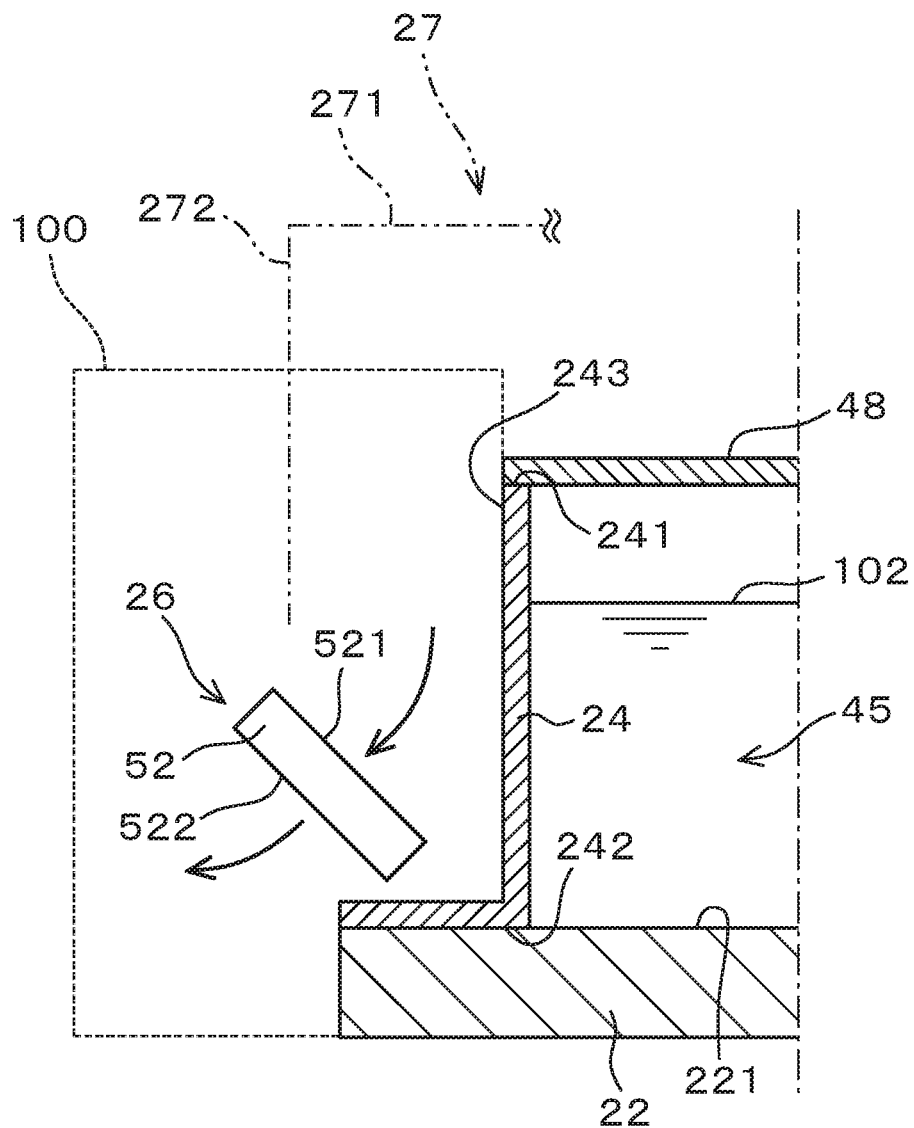
FIG. 23 is a schematic cross-sectional view of the main part of the vertical bearing device of the seventh embodiment.

As mentioned above, the preset range 100 is set within −¼h to ⅝h in the axial direction of the rotating shaft member 12, and within distance 2a from the outer peripheral face 243 in the radial direction of the rotating shaft member 12, as indicated by the shaded area in FIG. 22. As illustrated in FIG. 23, a radiating portion 52 of the cooling portion 26 has an air inlet 521 and an air outlet 522. Cooling air flowing along the outside of the casing 24 flows into the radiating portion 52 from the air inlet 521, passes through the radiating portion 52, and flows out from the air outlet 522. In the embodiment, the air inlet 521 of the radiating portion 52 is positioned in the preset range 100. In this case, of the radiating portion 52, only the air inlet 521 needs to be in the preset range 100, and the air outlet 522 may be out of the preset range 100 as illustrated in FIG. 23. Thus, by providing the air inlet 521 of the radiating portion 52 in the preset range 100, cooling capacity of the cooling portion 26 can be improved.

In addition, the radiating portion 52 may be configured such that the air inlet 521 is positioned in an optimal preset range 101 indicated by the crosshatched area in FIG. 22. The optimal preset range 101 is included in the preset range 100. The optimal preset range 101 is set from the reference point 0 to h downward in the axial direction of the rotating shaft member 12. Additionally, the optimal preset range 101 is set within a range of distance a from the outer peripheral face 243 in the radial direction of the rotating shaft member 12. By providing the air inlet 521 of the radiating portion 52 in the optimal preset range 101, cooling capacity of the cooling portion 26 can be improved even more.

Figure 24:
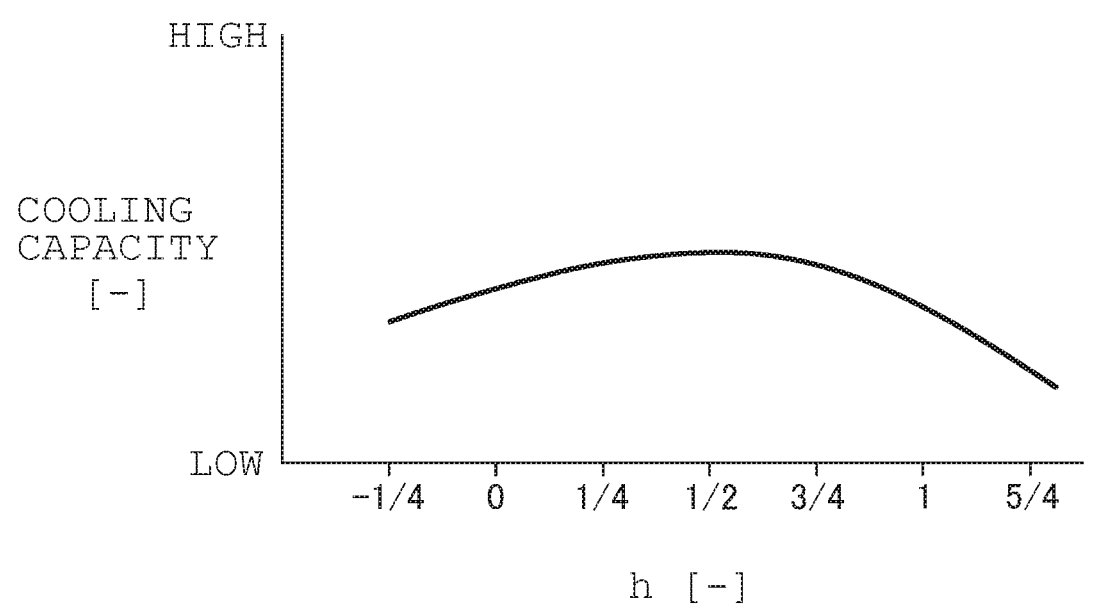
FIG. 24 is a schematic diagram illustrating a relationship between a preset range in the axial direction of a rotating shaft member and cooling capacity, in the vertical bearing device of the seventh embodiment.
Figure 25:
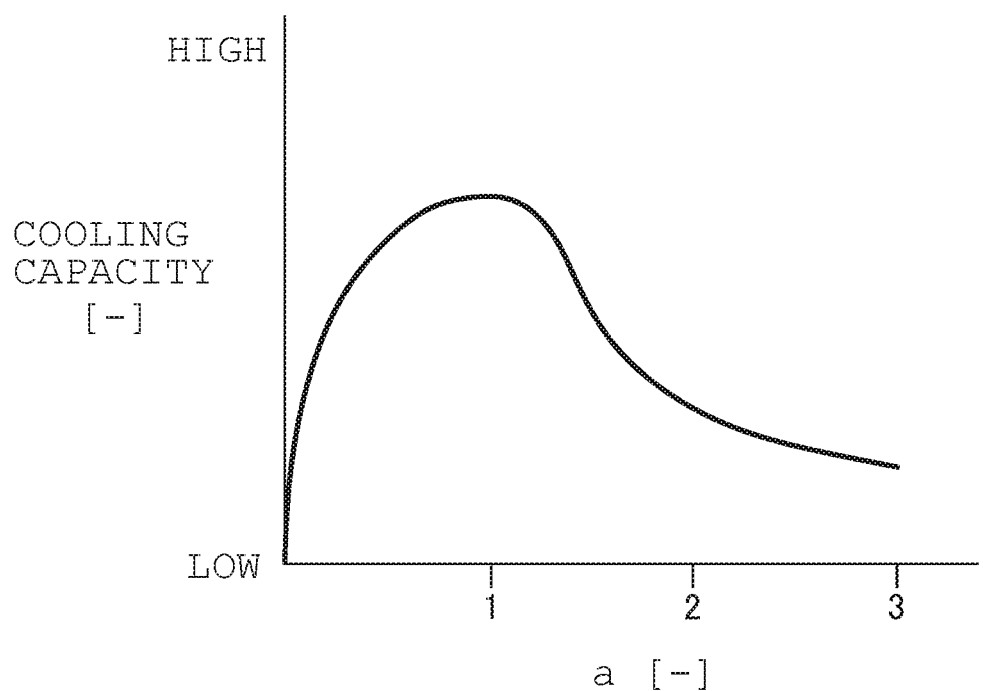
FIG. 25 is a schematic diagram illustrating a relationship between a preset range in the radial direction of the rotating shaft member and cooling capacity, in the vertical bearing device of the seventh embodiment.

As illustrated in FIG. 24, cooling capacity of the cooling portion 26 becomes the highest around ½h in the axial direction of the rotating shaft member 12. Accordingly, it can be seen that the center of installation of the radiating portion 52 of the cooling portion 26, whose height is in the axial direction of the rotating shaft member 12, is preferably set to ½h. Additionally, as illustrated in FIG. 25, cooling capacity of the cooling portion 26 becomes the highest around distance a in the radial direction of the rotating shaft member 12. Accordingly, it can be seen that the center of installation of the radiating portion 52 of the cooling portion 26 is preferably set to distance a. Moreover, it can be seen from FIGS. 24 and 25 that the air inlet 521 of the radiating portion 52 of the cooling portion 26 is preferably included in the preset range 100, and more preferably included in the optimal preset range 101.

Figure 26:
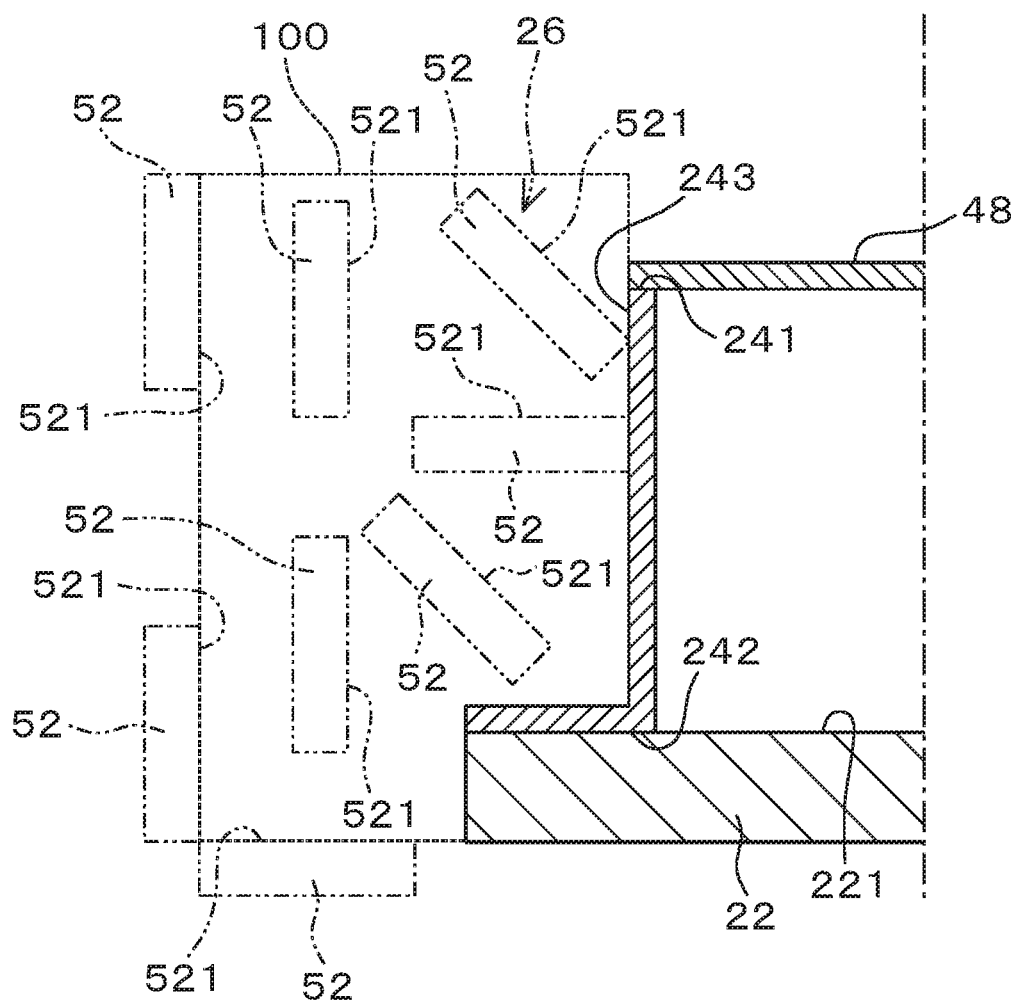
FIG. 26 is a schematic cross-sectional view of an exemplar arrangement of cooling parts in the vertical bearing device of the seventh embodiment.

As illustrated in FIG. 26, cooling capacity can be ensured by providing the cooling portion 26 in any position in the preset range 100 or the optimal preset range 101. Moreover, the radiating portion 52 of the cooling portion 26 may be tilted relative to the axis of the rotating shaft member 12, as illustrated in FIGS. 23 and 26. Since the radiating portion 52 is tilted relative to the axis of the rotating shaft member 12, it is easier to include the air inlet 521 in the preset range 100 or the optimal preset range 101. Specifically, the radiating portion 52 of the cooling portion 26 has a height in the axial direction, and width in the radial direction of the rotating shaft member 12. For this reason, by tilting the radiating portion 52, the radiating portion 52 can be included more easily in the preset range 100 or the optimal preset range 101, without changing the size of the radiating portion 52.

In addition to the above points, it is preferable that the radiating portion 52 of the cooling portion 26 be provided lower than the oil level of lubricating oil stored in the oil chamber 45, in the axial direction of the rotating shaft member 12. Specifically, as illustrated in FIG. 23, lubricating oil is stored in the oil chamber 45. At this time, an oil level 102 of the lubricating oil is positioned between the upper end face 241 and the lower end face 242 of the casing 24. In this case, the radiating portion 52 of the cooling portion 26 is preferably positioned lower than the oil level 102 in the oil chamber 45. Cooling air flows outside the casing 24, and therefore cools the casing 24 as well. By providing the radiating portion 52 lower than the oil level 102, the lubricating oil is cooled not only by the cooling portion 26, but also by air flowing outside the casing 24. Hence, lubricating oil is cooled both by the casing 24 and the cooling portion 26, and cooling efficiency is improved even more.

In the seventh embodiment, by including the air inlet 521 of the radiating portion 52 of the cooling portion 26 in a preset range, a stable air flow can be formed without ensuring a needless amount of distance between the casing 24 and the cooling portion 26. Accordingly, cooling capacity can be improved without complicating structure and maintenance.

Additionally, the preset range 100 and the optimal preset range 101 set in the seventh embodiment are applicable to other embodiments described above.

The aforementioned multiple embodiments describe an exemplar configuration in which the air blowing portion 53 blows air to the cooling portion 26, by the fan portion 54 rotating together with the rotating shaft member 12. However, the air blowing portion 53 is not limited to the above example, and any configuration is applicable as long as it can form a forcible air flow to the cooling portion 26 through the outer peripheral side of the casing 24. For example, the air blowing portion 53 may have a fan portion 54 or the like that is separate from the rotating shaft member 12, and blows air independently of the rotating shaft member 12.

What is claimed is:

1. A vertical bearing device comprising:
    a cylindrical thrust collar that rotates together with a rotating shaft member extending in a direction of gravitational force;
    a base plate that faces a lower end of the thrust collar;
    a thrust bearing part that is provided in a part where the thrust collar and the base plate face each other in an axial direction of the rotating shaft member and that supports the rotating shaft member in the axial direction;
    a casing that surrounds an outer peripheral side of the rotating shaft member, is formed into a container shape that, together with the base plate, integrally forms an oil chamber for storing lubricating oil and partitions the oil chamber into an upper oil chamber provided on the upper side and a lower oil chamber provided on the lower side in the direction of gravitational force;
    a journal bearing part that is provided in a part where the casing and the thrust collar face each other in a radial direction of the rotating shaft member and that supports the rotating shaft member in the radial direction;
    a cooling part that is provided integrally with the casing on the radially outer side of the casing has a lubricating oil passage part exposed from the casing and allows passage of the lubricating oil moving from the upper oil chamber to the lower oil chamber and cools the lubricating oil moving from the upper oil chamber to the lower oil chamber through the lubricating oil passage part by air on the outer peripheral side of the casing; and
    a cover that is provided outside the casing in the radial direction of the rotating shaft member, and that forms, with the casing, a space through which air flows, wherein:
    a casing has a flat plate portion in the circumferential direction,
    the cooling part is provided in a position facing the flat plate portion,
    the cooling part has an air inlet into which cooling air flows, and is positioned in a preset range;
    when a distance from the upper to lower ends of the oil chamber in the axial direction of the rotating shaft member is h, and the shortest distance between an outer peripheral face of the casing and an inner peripheral face of the cover is a,
        the preset range is set so that the center of the air inlet is positioned at a distance ranging from ¼h to ¾h downward relative to the upper end of the oil chamber as a reference point, in the axial direction of the rotating shaft member, and
        the center of the air inlet is set at a distance ranging from (½)a to (³⁄₂)a relative to the outer peripheral face of the casing as a reference point, in the radial direction of the rotating shaft member, and
    the cooling part has a radiation portion tilted relative to the axial direction of the rotating shaft member by an angle of more than 0 degrees and no more than 90 degrees.

2. The vertical bearing device according to claim 1, wherein
    the cooling part is provided lower than an oil level of lubricating oil stored in the oil chamber, in the axial direction of the rotating shaft member.

3. A rotary machine comprising:
    the vertical bearing device according to claim 1; and
    a rotor that has at least one end in the axial direction of the rotating shaft member supported by the vertical bearing device.

4. The vertical bearing device according to claim 1, wherein
    the cooling part has a straightening vane provided on an inlet side, where air flows into the radiation portion, the straightening vane aligning the air flow.

5. The vertical bearing device according to claim 1, further comprising a shielding plate provided between the cooling part and the casing, the shielding plate blocking transmission of heat from the cooling part to the casing.

6. A vertical bearing, comprising:
    a rotating shaft extending in an axial direction and defining a radial direction;
    a thrust collar rotating with the rotating shaft;
    a base plate facing a lower end of the thrust collar;
    a thrust bearing disposed where the thrust collar and the base plate face each other, wherein the thrust bearing supports the rotating shaft in the axial direction;
    a casing surrounding the rotating shaft;
    an oil chamber defined by the casing and the base plate, wherein the oil chamber comprises an upper oil chamber and a lower oil chamber;
    a journal bearing disposed where the casing and the thrust collar face each, wherein the journal bearing supports the rotating shaft in the radial direction;
    a cooling portion disposed exteriorly to an outer surface of the casing, wherein the cooling portion comprises a lubricating oil passage and a radiation portion;
    a cover forming, with the casing, a space through which the air flows; and
    a flat portion disposed circumferentially on the casing;
    wherein the cooling portion is disposed on the flat portion,
    wherein lubricating oil flows through the lubricating oil passage from the upper oil chamber to the lower oil chamber,
    wherein the cooling portion cools the lubricating oil via heat transfer with air surrounding the lubricating oil passage,
    wherein the radiation portion is tilted relative to the axial direction by an angle of more than 0 degrees and no more than 90 degrees,
    wherein the cooling portion includes an air inlet that is positioned within a preset range,
    wherein a distance h is defined between an upper end and a lower end of the oil chamber,
    wherein a distance a is defined between the outer surface of the casing and an inner surface of the cover,
    wherein the preset range is selected so that a center of the air inlet is positioned ¼h to ¾h axially downward from the upper end of the oil chamber, and
    wherein the preset range is selected so that the center of the air inlet is positioned ½a to ³⁄₂a radially outward from the outer surface of the casing.

* * * * *